US010340651B1

(12) United States Patent
Drummer et al.

(10) Patent No.: US 10,340,651 B1
(45) Date of Patent: Jul. 2, 2019

(54) LIDAR SYSTEM WITH OPTICAL TRIGGER

(71) Applicant: Luminar Technologies, Inc., Orlando, FL (US)

(72) Inventors: Mark A. Drummer, Orlando, FL (US); Scott R. Campbell, Sanford, FL (US); Alain Villeneuve, Mont Royal (CA); Laurance S. Lingvay, Orlando, FL (US)

(73) Assignee: Luminar Technologies, Inc., Orlando, FL (US)

( * ) Notice: Subject to any disclaimer, the term of this patent is extended or adjusted under 35 U.S.C. 154(b) by 0 days.

(21) Appl. No.: 16/106,238

(22) Filed: Aug. 21, 2018

(51) Int. Cl.
| | |
|---|---|
| *G01C 3/08* | (2006.01) |
| *H01S 3/094* | (2006.01) |
| *H01S 3/067* | (2006.01) |
| *H01S 3/16* | (2006.01) |
| *G01S 7/481* | (2006.01) |
| *G01S 17/42* | (2006.01) |
| *G01S 7/486* | (2006.01) |
| *G01S 17/10* | (2006.01) |

(52) U.S. Cl.
CPC ...... *H01S 3/094003* (2013.01); *G01S 7/4811* (2013.01); *G01S 7/4817* (2013.01); *G01S 7/4868* (2013.01); *G01S 17/10* (2013.01); *G01S 17/42* (2013.01); *H01S 3/06754* (2013.01); *H01S 3/1608* (2013.01); *H01S 3/1618* (2013.01)

(58) Field of Classification Search
CPC .... G01S 17/105; G01S 17/102; G01S 7/4873; G01S 7/4865; G01S 7/4876; G01S 7/4863; G01S 7/484

USPC ....................................................... 356/4.01
See application file for complete search history.

(56) References Cited

U.S. PATENT DOCUMENTS

| | | | |
|---|---|---|---|
| 4,521,107 A * | 6/1985 | Chaborski | G01S 7/4818 356/5.06 |
| 4,770,526 A * | 9/1988 | Manhart | G01S 7/483 356/5.07 |
| 5,006,721 A | 4/1991 | Cameron et al. | |
| 6,429,941 B1 * | 8/2002 | Kamon | G01S 7/497 356/5.01 |
| 6,449,384 B2 | 9/2002 | Laumeyer et al. | |
| 6,710,324 B2 | 3/2004 | Hipp | |
| 6,723,975 B2 | 4/2004 | Saccomanno | |
| 6,747,747 B2 | 6/2004 | Hipp | |
| 6,759,649 B2 | 7/2004 | Hipp | |

(Continued)

FOREIGN PATENT DOCUMENTS

| | | |
|---|---|---|
| WO | 2008/128359 | 10/2008 |
| WO | 2013/087799 | 6/2013 |

*Primary Examiner* — Mark Hellner

(57) ABSTRACT

In one embodiment, a lidar system includes a light source configured to emit a ranging pulse of light that is directed into a field of regard of the lidar system. The lidar system also includes a fiber-optic splitter configured to split off a portion of the ranging pulse of light to produce a trigger pulse of light that is directed to a receiver of the lidar system. The receiver is configured to detect, at a first time, at least a portion of the trigger pulse of light; and detect, at a second time subsequent to the first time, a portion of the ranging pulse of light scattered by a target located a distance from the lidar system. The lidar system further includes a processor configured to determine the distance from the lidar system to the target based at least in part on the first time and the second time.

30 Claims, 10 Drawing Sheets

(56) References Cited

U.S. PATENT DOCUMENTS

| | | |
|---|---|---|
| 6,917,415 B2 * | 7/2005 | Gogolla .............. G01S 7/4861 356/5.01 |
| 7,092,548 B2 | 5/2006 | Laumeyer et al. |
| 7,209,221 B2 | 4/2007 | Breed et al. |
| 7,345,271 B2 | 3/2008 | Boehlau et al. |
| 7,443,903 B2 | 10/2008 | Leonardo et al. |
| 7,532,311 B2 | 5/2009 | Henderson et al. |
| 7,570,793 B2 | 8/2009 | Lages et al. |
| 7,583,364 B1 | 9/2009 | Mayor et al. |
| 7,649,920 B2 | 1/2010 | Welford |
| 7,652,752 B2 | 1/2010 | Fetzer et al. |
| 7,839,491 B2 | 11/2010 | Harris et al. |
| 7,872,794 B1 | 1/2011 | Minelly et al. |
| 7,902,570 B2 | 3/2011 | Itzler et al. |
| 7,945,408 B2 | 5/2011 | Dimsdale et al. |
| 7,969,558 B2 | 6/2011 | Hall |
| 7,995,796 B2 | 8/2011 | Retterath et al. |
| 8,059,263 B2 | 11/2011 | Haberer et al. |
| 8,072,663 B2 | 12/2011 | O'Neill et al. |
| 8,081,301 B2 | 12/2011 | Stann et al. |
| 8,138,849 B2 | 3/2012 | West et al. |
| 8,279,420 B2 | 10/2012 | Ludwig et al. |
| 8,280,623 B2 | 10/2012 | Trepagnier et al. |
| 8,346,480 B2 | 1/2013 | Trepagnier et al. |
| 8,364,334 B2 | 1/2013 | Au et al. |
| 8,452,561 B2 | 5/2013 | Dimsdale et al. |
| 8,548,014 B2 | 10/2013 | Fermann et al. |
| 8,625,080 B2 | 1/2014 | Heizmann et al. |
| 8,675,181 B2 | 3/2014 | Hall |
| 8,723,955 B2 | 5/2014 | Kiehn et al. |
| 8,767,190 B2 | 7/2014 | Hall |
| 8,796,605 B2 | 8/2014 | Mordarski et al. |
| 8,836,922 B1 | 9/2014 | Pennecot et al. |
| 8,880,296 B2 | 11/2014 | Breed |
| 8,896,818 B2 | 11/2014 | Walsh et al. |
| 8,934,509 B2 | 1/2015 | Savage-Leuchs et al. |
| 9,000,347 B2 | 4/2015 | Woodward et al. |
| 9,041,136 B2 | 5/2015 | Chia |
| 9,048,370 B1 | 6/2015 | Urmson et al. |
| 9,063,549 B1 | 6/2015 | Pennecot et al. |
| 9,069,060 B1 | 6/2015 | Zbrozek et al. |
| 9,074,878 B2 | 7/2015 | Steffey et al. |
| 9,086,273 B1 | 7/2015 | Gruver et al. |
| 9,086,481 B1 | 7/2015 | Dowdall et al. |
| 9,091,754 B2 | 7/2015 | D'aligny |
| 9,103,669 B2 | 8/2015 | Giacotto et al. |
| 9,121,703 B1 | 9/2015 | Droz et al. |
| 9,160,140 B2 | 10/2015 | Gusev et al. |
| 9,170,333 B2 | 10/2015 | Mheen et al. |
| 9,199,641 B2 | 12/2015 | Ferguson et al. |
| 9,213,085 B2 | 12/2015 | Kanter |
| 9,239,260 B2 | 1/2016 | Bayha et al. |
| 9,246,041 B1 | 1/2016 | Clausen et al. |
| 9,285,464 B2 | 3/2016 | Pennecot et al. |
| 9,285,477 B1 | 3/2016 | Smith et al. |
| 9,297,901 B2 | 3/2016 | Bayha et al. |
| 9,299,731 B1 | 3/2016 | Lenius et al. |
| 9,304,154 B1 | 4/2016 | Droz et al. |
| 9,304,203 B1 | 4/2016 | Droz et al. |
| 9,304,316 B2 | 4/2016 | Weiss et al. |
| 9,310,471 B2 | 4/2016 | Sayyah et al. |
| 9,335,255 B2 | 5/2016 | Retterath et al. |
| 9,360,554 B2 | 6/2016 | Retterath et al. |
| 9,368,933 B1 | 6/2016 | Nijjar et al. |
| 9,383,201 B2 | 7/2016 | Jackman et al. |
| 9,383,445 B2 | 7/2016 | Lu et al. |
| 9,383,753 B1 | 7/2016 | Templeton et al. |
| 9,599,468 B2 * | 3/2017 | Walsh .................. G01S 7/4818 |
| RE46,672 E | 1/2018 | Hall |
| 2006/0290920 A1 | 12/2006 | Kampchen et al. |
| 2009/0273770 A1 | 11/2009 | Bauhahn et al. |
| 2010/0034221 A1 | 2/2010 | Dragic |
| 2012/0227263 A1 | 9/2012 | Leclair et al. |
| 2013/0033742 A1 | 2/2013 | Rogers et al. |
| 2014/0111805 A1 | 4/2014 | Albert et al. |
| 2014/0168631 A1 | 6/2014 | Haslim et al. |
| 2014/0176933 A1 | 6/2014 | Haslim et al. |
| 2014/0211194 A1 | 7/2014 | Pacala et al. |
| 2014/0293263 A1 | 10/2014 | Justice et al. |
| 2014/0293266 A1 | 10/2014 | Hsu et al. |
| 2015/0131080 A1 | 5/2015 | Retterath et al. |
| 2015/0177368 A1 | 6/2015 | Bayha et al. |
| 2015/0185244 A1 | 7/2015 | Inoue et al. |
| 2015/0185313 A1 | 7/2015 | Zhu |
| 2015/0192676 A1 | 7/2015 | Kotelnikov et al. |
| 2015/0192677 A1 | 7/2015 | Yu et al. |
| 2015/0204978 A1 | 7/2015 | Hammes et al. |
| 2015/0214690 A1 | 7/2015 | Savage-Leuchs et al. |
| 2015/0301182 A1 | 10/2015 | Geiger et al. |
| 2015/0323654 A1 | 11/2015 | Jachmann et al. |
| 2015/0378023 A1 | 12/2015 | Royo Royo et al. |
| 2015/0378241 A1 | 12/2015 | Eldada |
| 2016/0025842 A1 | 1/2016 | Anderson et al. |
| 2016/0047896 A1 | 2/2016 | Dussan |
| 2016/0047901 A1 | 2/2016 | Pacala et al. |
| 2016/0049765 A1 | 2/2016 | Eldada |
| 2016/0146939 A1 | 5/2016 | Shpunt et al. |
| 2016/0146940 A1 | 5/2016 | Koehler |
| 2016/0161600 A1 | 6/2016 | Eldada et al. |
| 2016/0245919 A1 | 8/2016 | Kalscheur et al. |
| 2018/0329067 A1 * | 11/2018 | Boehmke ................ G01S 17/89 |

\* cited by examiner

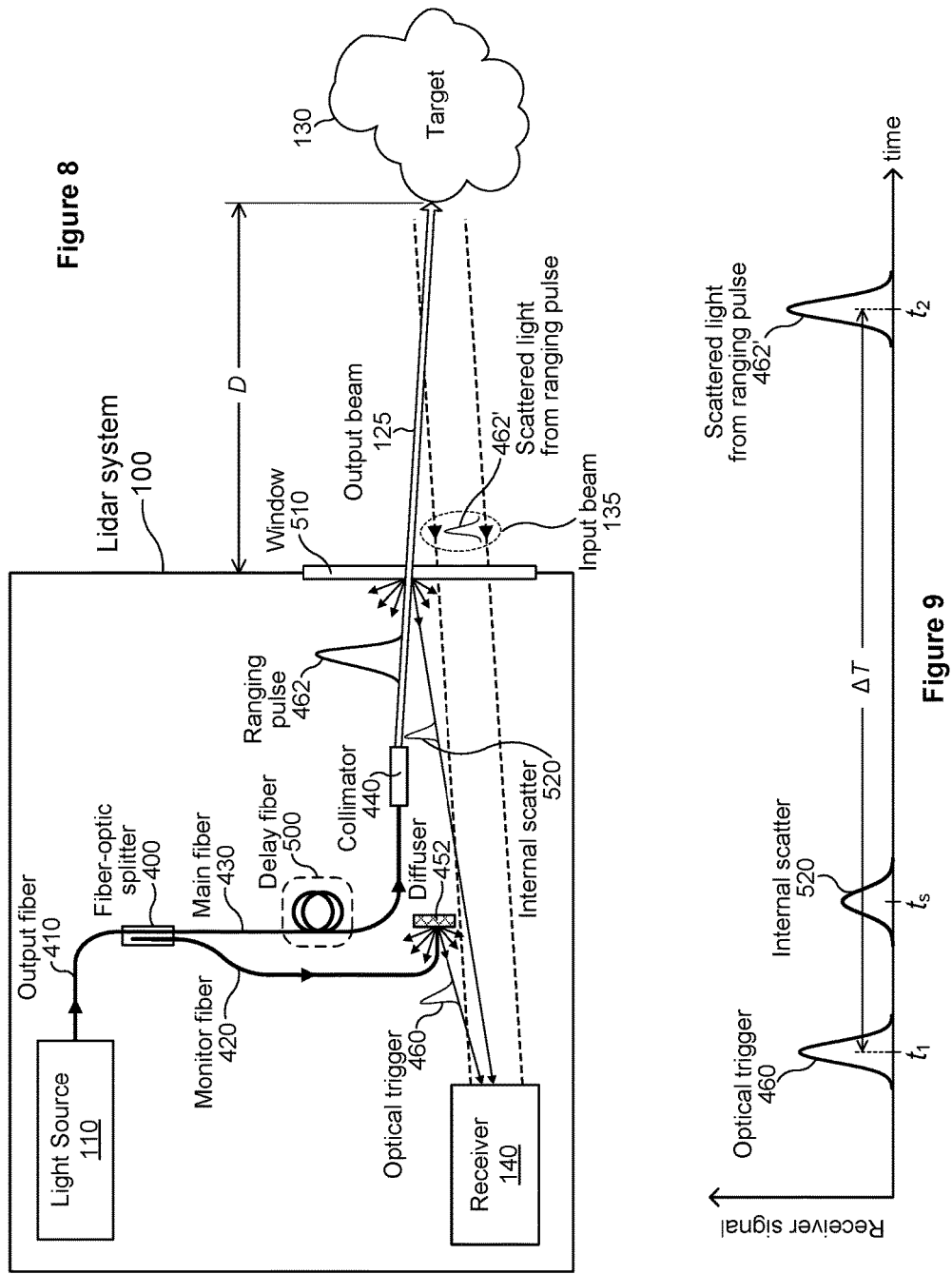

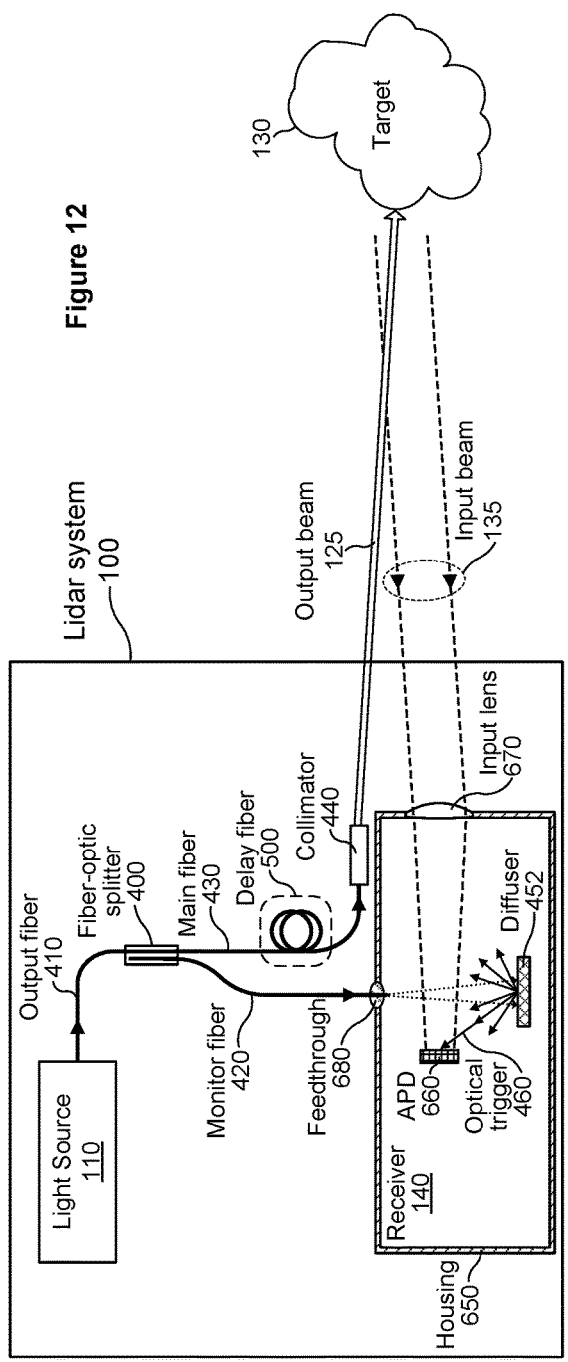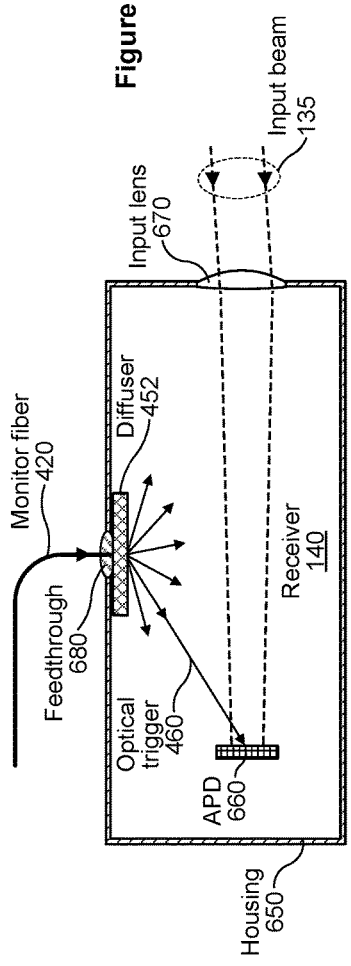

LIDAR SYSTEM WITH OPTICAL TRIGGER

TECHNICAL FIELD

This disclosure generally relates to lidar systems.

BACKGROUND

Light detection and ranging (lidar) is a technology that can be used to measure distances to remote targets. Typically, a lidar system includes a light source and an optical receiver. The light source can include, for example, a laser which emits light having a particular operating wavelength. The operating wavelength of a lidar system may lie, for example, in the infrared, visible, or ultraviolet portions of the electromagnetic spectrum. The light source emits light toward a target which scatters the light, and some of the scattered light is received back at the receiver. The system determines the distance to the target based on one or more characteristics associated with the received light. For example, the lidar system may determine the distance to the target based on the time of flight for a pulse of light emitted by the light source to travel to the target and back to the lidar system.

BRIEF DESCRIPTION OF THE DRAWINGS

FIG. 8 illustrates an example lidar system that includes a diffuser and an optical-delay fiber.

FIG. 9 illustrates an example receiver signal for the lidar system of FIG. 8.

FIG. 12 illustrates an example lidar system with a receiver that includes a feedthrough for an optical trigger.

FIG. 13 illustrates an example receiver that includes a transmissive optical diffuser.

DESCRIPTION OF EXAMPLE EMBODIMENTS

Figure 1:
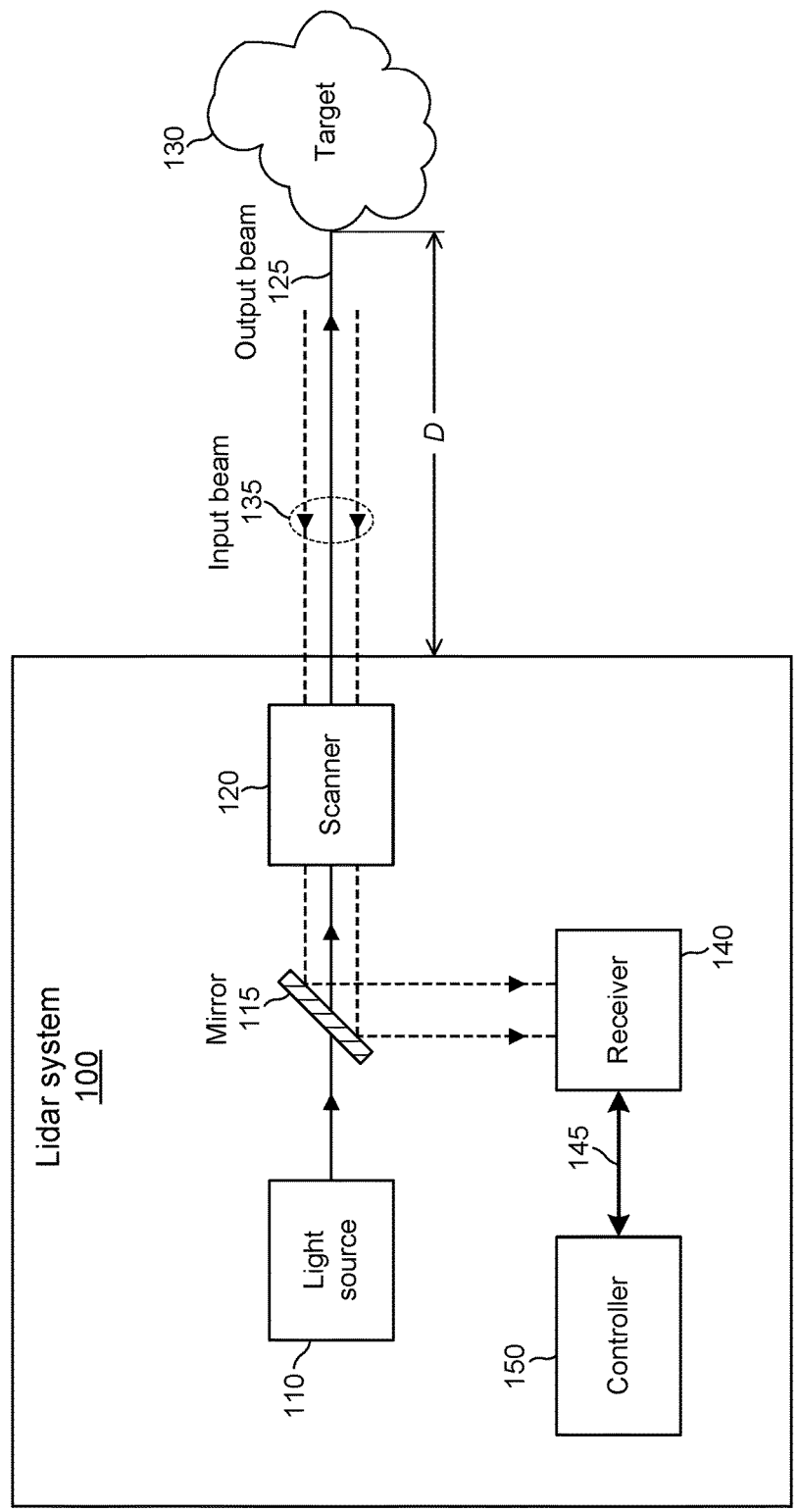
FIG. 1 illustrates an example light detection and ranging (lidar) system.

FIG. 1 illustrates an example light detection and ranging (lidar) system 100. In particular embodiments, a lidar system 100 may be referred to as a laser ranging system, a laser radar system, a LIDAR system, a lidar sensor, or a laser detection and ranging (LADAR or ladar) system. In particular embodiments, a lidar system 100 may include a light source 110, mirror 115, scanner 120, receiver 140, or controller 150. The light source 110 may include, for example, a laser which emits light having a particular operating wavelength in the infrared, visible, or ultraviolet portions of the electromagnetic spectrum. As an example, light source 110 may include a laser with an operating wavelength between approximately 900 nanometers (nm) and 2000 nm. The light source 110 emits an output beam of light 125 which may be continuous wave (CW), pulsed, or modulated in any suitable manner for a given application. The output beam of light 125 is directed downrange toward a remote target 130. As an example, the remote target 130 may be located a distance D of approximately 1 m to 1 km from the lidar system 100.

Once the output beam 125 reaches the downrange target 130, the target may scatter or reflect at least a portion of light from the output beam 125, and some of the scattered or reflected light may return toward the lidar system 100. In the example of FIG. 1, the scattered or reflected light is represented by input beam 135, which passes through scanner 120 and is reflected by mirror 115 and directed to receiver 140. In particular embodiments, a relatively small fraction of the light from output beam 125 may return to the lidar system 100 as input beam 135. As an example, the ratio of input beam 135 average power, peak power, or pulse energy to output beam 125 average power, peak power, or pulse energy may be approximately $10^{-1}$, $10^{-2}$, $10^{-3}$, $10^{-4}$, $10^{-5}$, $10^{-6}$, $10^{-7}$, $10^{-8}$, $10^{-9}$, $10^{-10}$, $10^{-11}$, or $10^{-12}$. As another example, if a pulse of output beam 125 has a pulse energy of 1 microjoule (µJ), then the pulse energy of a corresponding pulse of input beam 135 may have a pulse energy of approximately 10 nanojoules (nJ), 1 nJ, 100 picojoules (pJ), 10 pJ, 1 pJ, 100 femtojoules (fJ), 10 fJ, 1 fJ, 100 attojoules (aJ), 10 aJ, 1 aJ, or 0.1 aJ. In particular embodiments, output beam 125 may be referred to as a laser beam, light beam, optical beam, emitted beam, or beam. In particular embodiments, input beam 135 may be referred to as a return beam, received beam, return light, received light, input light, scattered light, or reflected light. As used herein, scattered light may refer to light that is scattered or reflected by a target 130. As an example, an input beam 135 may include: light from the output beam 125 that is scattered by target 130; light from the output beam 125 that is reflected by target 130; or a combination of scattered and reflected light from target 130.

In particular embodiments, receiver 140 may receive or detect photons from input beam 135 and generate one or more representative signals. For example, the receiver 140 may generate an output electrical signal 145 that is representative of the input beam 135, and the electrical signal 145 may be sent to controller 150. In particular embodiments, receiver 140 or controller 150 may include a processor, computing system (e.g., an ASIC or FPGA), or other suitable circuitry. A controller 150 may be configured to analyze one or more characteristics of the electrical signal 145 from the receiver 140 to determine one or more characteristics of the target 130, such as its distance downrange from the lidar system 100. This can be done, for example, by analyzing the time of flight or phase modulation for a beam of light 125 transmitted by the light source 110. If lidar system 100 measures a time of flight of T (e.g., T represents a round-trip time of flight for an emitted pulse of light to travel from the lidar system 100 to the target 130 and back to the lidar system 100), then the distance D from the target 130 to the lidar system 100 may be expressed as $D = c \cdot T/2$, where c is the speed of light (approximately $3.0 \times 10^8$ m/s). As an example, if a time of flight is measured to be T=300 ns, then the distance from the target 130 to the lidar system 100 may be determined to be approximately D=45.0 m. As another example, if a time of flight is measured to be T=1.33 µs, then the distance from the target 130 to the lidar system 100 may be determined to be approximately D=199.5 m. In particular embodiments, a distance D from lidar system 100 to a target 130 may be referred to as a distance, depth, or range of target 130. As used herein, the speed of light c refers to the speed of light in any suitable medium, such as for example in air, water, or vacuum. As an example, the speed of light in vacuum is approximately $2.9979 \times 10^8$ m/s, and the speed of light in air (which has a refractive index of approximately 1.0003) is approximately $2.9970 \times 10^8$ m/s.

In particular embodiments, light source 110 may include a pulsed laser. As an example, light source 110 may be a pulsed laser configured to produce or emit pulses of light with a pulse duration or pulse width of approximately 10 picoseconds (ps) to 100 nanoseconds (ns). The pulses may have a pulse duration of approximately 100 ps, 200 ps, 400 ps, 1 ns, 2 ns, 5 ns, 10 ns, 20 ns, 50 ns, 100 ns, or any other suitable pulse duration. As another example, light source 110 may be a pulsed laser that produces pulses with a pulse duration of approximately 1-5 ns. As another example, light source 110 may be a pulsed laser that produces pulses at a pulse repetition frequency of approximately 100 kHz to 5 MHz or a pulse period (e.g., a time between consecutive pulses) of approximately 200 ns to 10 µs. In particular embodiments, light source 110 may have a substantially constant pulse repetition frequency, or light source 110 may have a variable or adjustable pulse repetition frequency. As an example, light source 110 may be a pulsed laser that produces pulses at a substantially constant pulse repetition frequency of approximately 640 kHz (e.g., 640,000 pulses per second), corresponding to a pulse period of approximately 1.56 µs. As another example, light source 110 may have a pulse repetition frequency (which may be referred to as a repetition rate) that can be varied from approximately 500 kHz to 3 MHz. As used herein, a pulse of light may be referred to as an optical pulse, a light pulse, a ranging pulse of light, a ranging pulse, or a pulse.

In particular embodiments, light source 110 may produce a free-space output beam 125 having any suitable average optical power. As an example, output beam 125 may have an average power of approximately 1 milliwatt (mW), 10 mW, 100 mW, 1 watt (W), 10 W, or any other suitable average power. In particular embodiments, output beam 125 may include optical pulses with any suitable pulse energy or peak optical power. As an example, output beam 125 may include pulses with a pulse energy of approximately 0.01 µJ, 0.1 µJ, 1 µJ, 10 µJ, 100 µJ, 1 mJ, or any other suitable pulse energy. As another example, output beam 125 may include pulses with a peak power of approximately 10 W, 100 W, 1 kW, 5 kW, 10 kW, or any other suitable peak power. The peak power ($P_{peak}$) of a pulse of light can be related to the pulse energy (E) by the expression $E = P_{peak} \cdot \Delta T$, where $\Delta T$ is the duration of the pulse, and the duration of a pulse may be defined as the full width at half maximum duration of the pulse. For example, an optical pulse with a duration of 1 ns and a pulse energy of 1 µJ has a peak power of approximately 1 kW. The average power ($P_{av}$) of an output beam 125 can be related to the pulse repetition frequency (PRF) and pulse energy by the expression $P_{av} = PRF \cdot E$. For example, if the pulse repetition frequency is 500 kHz, then the average power of an output beam 125 with 1-µJ pulses is approximately 0.5 W.

In particular embodiments, light source 110 may include a laser diode, such as for example, a Fabry-Perot laser diode, a quantum well laser, a distributed Bragg reflector (DBR) laser, a distributed feedback (DFB) laser, or a vertical-cavity surface-emitting laser (VCSEL). As an example, light source 110 may include an aluminum-gallium-arsenide (AlGaAs) laser diode, an indium-gallium-arsenide (InGaAs) laser diode, an indium-gallium-arsenide-phosphide (InGaAsP) laser diode, or a laser diode that includes any suitable combination of aluminum (Al), indium (In), gallium (Ga), arsenic (As), phosphorous (P), or any other suitable material. In particular embodiments, light source 110 may include a pulsed laser diode with a peak emission wavelength between 1400 nm and 1600 nm. As an example, light source 110 may include a current-modulated InGaAsP DFB laser diode that produces optical pulses at a wavelength of approximately 1550 nm.

In particular embodiments, light source 110 may include a pulsed or CW laser diode followed by one or more optical-amplification stages. A pulsed laser diode may produce relatively low-power optical seed pulses which are amplified by an optical amplifier. As an example, light source 110 may be a fiber-laser module that includes a current-modulated laser diode with an operating wavelength of approximately 1550 nm followed by a single-stage or a multi-stage erbium-doped fiber amplifier (EDFA) that amplifies the seed pulses from the laser diode. As another example, light source 110 may include a continuous-wave (CW) or quasi-CW laser diode followed by an external optical modulator (e.g., an electro-optic amplitude modulator). The optical modulator may modulate the CW light from the laser diode to produce optical pulses which are sent to an optical amplifier. As another example, light source 110 may include a pulsed or CW laser diode followed by a semiconductor optical amplifier (SOA). The SOA may include an active optical waveguide configured to receive light from the laser diode and amplify the light as it propagates through the waveguide. The SOA may be integrated on the same chip as the laser diode, or the SOA may be a separate device with an anti-reflection coating on its input facet or output facet. In particular embodiments, light source 110 may include a laser diode which produces optical pulses that are not amplified by an optical amplifier. As an example, a direct-emitter laser diode (which may be referred to as a direct emitter) may emit optical pulses that form an output beam 125 that is directed downrange from a lidar system 100. A light source 110 that includes a direct-emitter laser diode may not include an optical amplifier, and the optical pulses produced by a direct emitter may not be amplified. A direct-emitter laser diode may be driven by an electrical power source that supplies current pulses to the laser diode, and each current pulse may result in the emission of an output optical pulse.

In particular embodiments, an output beam of light 125 emitted by light source 110 may be a collimated optical beam having any suitable beam divergence, such as for example, a full-angle beam divergence of approximately 0.5 to 10 milliradians (mrad). A divergence of output beam 125 may refer to an angular measure of an increase in beam size (e.g., a beam radius or beam diameter) as output beam 125 travels away from light source 110 or lidar system 100. In particular embodiments, output beam 125 may have a substantially circular cross section with a beam divergence characterized by a single divergence value. As an example, an output beam 125 with a circular cross section and a full-angle beam divergence of 2 mrad may have a beam diameter or spot size of approximately 20 cm at a distance of 100 m from lidar system 100. In particular embodiments, output beam 125 may have a substantially elliptical cross section characterized by two divergence values. As an example, output beam 125 may have a fast axis and a slow axis, where the fast-axis divergence is greater than the slow-axis divergence. As another example, output beam 125 may be an elliptical beam with a fast-axis divergence of 4 mrad and a slow-axis divergence of 2 mrad.

In particular embodiments, an output beam of light 125 emitted by light source 110 may be unpolarized or randomly polarized, may have no specific or fixed polarization (e.g., the polarization may vary with time), or may have a particular polarization (e.g., output beam 125 may be linearly polarized, elliptically polarized, or circularly polarized). As an example, light source 110 may produce light with no specific polarization or may produce light that is linearly polarized.

In particular embodiments, lidar system 100 may include one or more optical components configured to reflect, focus, filter, shape, modify, steer, or direct light within the lidar system 100 or light produced or received by the lidar system 100 (e.g., output beam 125 or input beam 135). As an example, lidar system 100 may include one or more lenses, mirrors, filters (e.g., bandpass or interference filters), beam splitters, polarizers, polarizing beam splitters, wave plates (e.g., half-wave or quarter-wave plates), diffractive elements, holographic elements, isolators, couplers, detectors, beam combiners, or collimators. The optical components in a lidar system 100 may be free-space optical components, fiber-coupled optical components, or a combination of free-space and fiber-coupled optical components.

In particular embodiments, lidar system 100 may include a telescope, one or more lenses, or one or more mirrors configured to expand, focus, or collimate the output beam 125 or the input beam 135 to a desired beam diameter or divergence. As an example, the lidar system 100 may include one or more lenses to focus the input beam 135 onto a photodetector of receiver 140. As another example, the lidar system 100 may include one or more flat mirrors or curved mirrors (e.g., concave, convex, or parabolic mirrors) to steer or focus the output beam 125 or the input beam 135. For example, the lidar system 100 may include an off-axis parabolic mirror to focus the input beam 135 onto a photodetector of receiver 140. As illustrated in FIG. 1, the lidar system 100 may include mirror 115 (which may be a metallic or dielectric mirror), and mirror 115 may be configured so that light beam 125 passes through the mirror 115 or passes along an edge or side of the mirror 115 and input beam 135 is reflected toward the receiver 140. As an example, mirror 115 (which may be referred to as an overlap mirror, superposition mirror, or beam-combiner mirror) may include a hole, slot, or aperture which output light beam 125 passes through. As another example, rather than passing through the mirror 115, the output beam 125 may be directed to pass alongside the mirror 115 with a gap (e.g., a gap of width approximately 0.1 mm, 0.5 mm, 1 mm, 2 mm, 5 mm, or 10 mm) between the output beam 125 and an edge of the mirror 115.

In particular embodiments, mirror 115 may provide for output beam 125 and input beam 135 to be substantially coaxial so that the two beams travel along approximately the same optical path (albeit in opposite directions). The input and output beams being substantially coaxial may refer to the beams being at least partially overlapped or sharing a common propagation axis so that input beam 135 and output beam 125 travel along substantially the same optical path (albeit in opposite directions). As an example, output beam 125 and input beam 135 may be parallel to each other to within less than 10 mrad, 5 mrad, 2 mrad, 1 mrad, 0.5 mrad, or 0.1 mrad. As output beam 125 is scanned across a field of regard, the input beam 135 may follow along with the output beam 125 so that the coaxial relationship between the two beams is maintained.

In particular embodiments, lidar system 100 may include a scanner 120 configured to scan an output beam 125 across a field of regard of the lidar system 100. As an example, scanner 120 may include one or more scanning mirrors configured to pivot, rotate, oscillate, or move in an angular manner about one or more rotation axes. The output beam 125 may be reflected by a scanning mirror, and as the scanning mirror pivots or rotates, the reflected output beam 125 may be scanned in a corresponding angular manner. As an example, a scanning mirror may be configured to periodically pivot back and forth over a 30-degree range, which results in the output beam 125 scanning back and forth across a 60-degree range (e.g., a Θ-degree rotation by a scanning mirror results in a 2Θ-degree angular scan of output beam 125).

In particular embodiments, a scanning mirror may be attached to or mechanically driven by a scanner actuator or mechanism which pivots or rotates the mirror over a particular angular range (e.g., over a 5° angular range, 30° angular range, 60° angular range, 120° angular range, 360° angular range, or any other suitable angular range). A scanner actuator or mechanism configured to pivot or rotate a mirror may include a galvanometer scanner, a resonant scanner, a piezoelectric actuator, a voice coil motor, an electric motor (e.g., a DC motor, a brushless DC motor, a synchronous electric motor, or a stepper motor), a microelectromechanical systems (MEMS) device, or any other suitable actuator or mechanism. As an example, a scanner 120 may include a scanning mirror attached to a galvanometer scanner configured to pivot back and forth over a 30° angular range. As another example, a scanner 120 may include a polygon mirror configured to rotate continuously in the same direction (e.g., rather than pivoting back and forth, the polygon mirror continuously rotates 360 degrees in a clockwise or counterclockwise direction). The polygon mirror may be coupled or attached to a synchronous motor configured to rotate the polygon mirror at a substantially fixed rotational frequency (e.g., a rotational frequency of approximately 1 Hz, 10 Hz, 50 Hz, 100 Hz, 500 Hz, or 1,000 Hz).

In particular embodiments, scanner 120 may be configured to scan the output beam 125 (which may include at least a portion of the light emitted by light source 110) across a field of regard of the lidar system 100. A field of regard (FOR) of a lidar system 100 may refer to an area, region, or angular range over which the lidar system 100 may be configured to scan or capture distance information. As an example, a lidar system 100 with an output beam 125 with a 30-degree scanning range may be referred to as having a 30-degree angular field of regard. As another example, a lidar system 100 with a scanning mirror that rotates over a 30-degree range may produce an output beam 125 that scans across a 60-degree range (e.g., a 60-degree FOR). In particular embodiments, lidar system 100 may have a FOR of approximately 10°, 20°, 40°, 60°, 120°, 360°, or any other suitable FOR.

In particular embodiments, scanner 120 may be configured to scan the output beam 125 horizontally and vertically, and lidar system 100 may have a particular FOR along the horizontal direction and another particular FOR along the vertical direction. As an example, lidar system 100 may have a horizontal FOR of 10° to 120° and a vertical FOR of 2° to 45°. In particular embodiments, scanner 120 may include a first scan mirror and a second scan mirror, where the first scan mirror directs the output beam 125 toward the second scan mirror, and the second scan mirror directs the output beam 125 downrange from the lidar system 100. As an example, the first scan mirror may scan the output beam 125 along a first direction, and the second scan mirror may scan the output beam 125 along a second direction that is substantially orthogonal to the first direction. As another example, the first scan mirror may scan the output beam 125 along a substantially horizontal direction, and the second scan mirror may scan the output beam 125 along a substantially vertical direction (or vice versa). In particular embodiments, scanner 120 may be referred to as a beam scanner, optical scanner, or laser scanner.

In particular embodiments, one or more scanning mirrors may be communicatively coupled to controller 150 which may control the scanning mirror(s) so as to guide the output beam 125 in a desired direction downrange or along a desired scan pattern. In particular embodiments, a scan pattern may refer to a pattern or path along which the output beam 125 is directed. As an example, scanner 120 may include two scanning mirrors configured to scan the output beam 125 across a 60° horizontal FOR and a 20° vertical FOR. The two scanner mirrors may be controlled to follow a scan path that substantially covers the 60°×20° FOR. As an example, the scan path may result in a point cloud with pixels that substantially cover the 60°×20° FOR. The pixels may be approximately evenly distributed across the 60°×20° FOR. Alternatively, the pixels may have a particular non-uniform distribution (e.g., the pixels may be distributed across all or a portion of the 60°×20° FOR, and the pixels may have a higher density in one or more particular regions of the 60°×20° FOR).

In particular embodiments, a lidar system 100 may include a light source 110 configured to emit pulses of light and a scanner 120 configured to scan at least a portion of the emitted pulses of light across a field of regard of the lidar system 100. Each emitted pulse of light may be referred to as a ranging pulse of light or a ranging pulse. One or more of the emitted pulses of light may be scattered by a target 130 located downrange from the lidar system 100, and a receiver 140 may detect at least a portion of the pulses of light scattered by the target 130. A receiver 140 may be referred to as a photoreceiver, optical receiver, optical sensor, detector, photodetector, or optical detector. In particular embodiments, lidar system 100 may include a receiver 140 that receives or detects at least a portion of input beam 135 and produces an electrical signal that corresponds to input beam 135. As an example, if input beam 135 includes an optical pulse, then receiver 140 may produce an electrical current or voltage pulse that corresponds to the optical pulse detected by receiver 140. As another example, receiver 140 may include one or more avalanche photodiodes (APDs) or one or more single-photon avalanche diodes (SPADs). As another example, receiver 140 may include one or more PN photodiodes (e.g., a photodiode structure formed by a p-type semiconductor and a n-type semiconductor) or one or more PIN photodiodes (e.g., a photodiode structure formed by an undoped intrinsic semiconductor region located between p-type and n-type regions). An APD, SPAD, PN photodiode, or PIN photodiode may each be referred to as a detector, photodetector, or photodiode. A detector may have an active region or an avalanche-multiplication region that includes silicon, germanium, InGaAs, or AlInAsSb (aluminum indium arsenide antimonide). The active region may refer to an area over which a detector may receive or detect input light. An active region may have any suitable size or diameter, such as for example, a diameter of approximately 10 μm, 25 μm, 50 μm, 80 μm, 100 μm, 200 μm, 500 μm, 1 mm, 2 mm, or 5 mm.

In particular embodiments, receiver 140 may include circuitry that performs signal amplification, sampling, filtering, signal conditioning, analog-to-digital conversion, time-to-digital conversion, pulse detection, threshold detection, rising-edge detection, or falling-edge detection. As an example, receiver 140 may include a transimpedance amplifier that converts a received photocurrent (e.g., a current produced by an APD in response to a received optical signal) into a voltage signal. The voltage signal may be sent to pulse-detection circuitry that produces an analog or digital output signal 145 that corresponds to one or more characteristics (e.g., rising edge, falling edge, amplitude, or duration) of a received optical pulse. As an example, the pulse-detection circuitry may perform a time-to-digital conversion to produce a digital output signal 145. The electrical output signal 145 may be sent to controller 150 for processing or analysis (e.g., to determine a time-of-flight value corresponding to a received optical pulse).

In particular embodiments, controller 150 may be electrically coupled or communicatively coupled to light source 110, scanner 120, or receiver 140. As an example, controller 150 may receive electrical trigger pulses or edges from light source 110, where each pulse or edge corresponds to the emission of an optical pulse by light source 110. As another example, controller 150 may provide instructions, a control signal, or a trigger signal to light source 110 indicating when light source 110 should produce optical pulses. Controller 150 may send an electrical trigger signal that includes electrical pulses, where each electrical pulse results in the emission of an optical pulse by light source 110. In particular embodiments, the frequency, period, duration, pulse energy, peak power, average power, or wavelength of the optical pulses produced by light source 110 may be adjusted based on instructions, a control signal, or trigger pulses provided by controller 150. In particular embodiments, controller 150 may be coupled to light source 110 and receiver 140, and controller 150 may determine a time-of-flight value for an optical pulse based on timing information associated with when the pulse was emitted by light source 110 and when a portion of the pulse (e.g., input beam 135) was detected or received by receiver 140. In particular embodiments, controller 150 may include circuitry that performs signal amplification, sampling, filtering, signal conditioning, analog-to-digital conversion, time-to-digital conversion, pulse detection, threshold detection, rising-edge detection, or falling-edge detection.

In particular embodiments, lidar system 100 may include one or more processors (e.g., a controller 150) configured to determine a distance D from the lidar system 100 to a target 130 based at least in part on a round-trip time of flight for an emitted pulse of light to travel from the lidar system 100 to the target 130 and back to the lidar system 100. The emitted pulse may be referred to as a ranging pulse of light or a ranging pulse. The target 130 may be at least partially contained within a field of regard of the lidar system 100 and located a distance D from the lidar system 100 that is less than or equal to a maximum range $R_{MAX}$ of the lidar system 100. In particular embodiments, a maximum range (which may be referred to as a maximum distance) of a lidar system 100 may refer to the maximum distance over which the lidar system 100 is configured to sense or identify targets 130 that appear in a field of regard of the lidar system 100. The maximum range of lidar system 100 may be any suitable distance, such as for example, 25 m, 50 m, 100 m, 200 m, 500 m, or 1 km. As an example, a lidar system 100 with a 200-m maximum range may be configured to sense or identify various targets 130 located up to 200 m away from the lidar system 100. For a lidar system 100 with a 200-m maximum range ($R_{MAX}$=200 m), the time of flight corresponding to the maximum range is approximately $2 \cdot R_{MAX}/c \approx 1.33$ μs.

In particular embodiments, a lidar system 100 may be used to determine the distance to one or more downrange targets 130. By scanning the lidar system 100 across a field of regard, the system can be used to map the distance to a number of points within the field of regard. Each of these depth-mapped points may be referred to as a pixel or a voxel. A collection of pixels captured in succession (which may be referred to as a depth map, a point cloud, or a frame) may be rendered as an image or may be analyzed to identify or detect objects or to determine a shape or distance of objects within the FOR. As an example, a point cloud may cover a field of regard that extends 60° horizontally and 15° vertically, and the point cloud may include a frame of 100-2000 pixels in the horizontal direction by 4-400 pixels in the vertical direction.

In particular embodiments, lidar system 100 may be configured to repeatedly capture or generate point clouds of a field of regard at any suitable frame rate between approximately 0.1 frames per second (FPS) and approximately 1,000 FPS. As an example, lidar system 100 may generate point clouds at a frame rate of approximately 0.1 FPS, 0.5 FPS, 1 FPS, 2 FPS, 5 FPS, 10 FPS, 20 FPS, 100 FPS, 500 FPS, or 1,000 FPS. As another example, lidar system 100 may be configured to produce optical pulses at a rate of $5 \times 10^5$ pulses/second (e.g., the system may determine 500,000 pixel distances per second) and scan a frame of 1000×50 pixels (e.g., 50,000 pixels/frame), which corresponds to a point-cloud frame rate of 10 frames per second (e.g., 10 point clouds per second). In particular embodiments, a point-cloud frame rate may be substantially fixed, or a point-cloud frame rate may be dynamically adjustable. As an example, a lidar system 100 may capture one or more point clouds at a particular frame rate (e.g., 1 Hz) and then switch to capture one or more point clouds at a different frame rate (e.g., 10 Hz). A slower frame rate (e.g., 1 Hz) may be used to capture one or more high-resolution point clouds, and a faster frame rate (e.g., 10 Hz) may be used to rapidly capture multiple lower-resolution point clouds.

In particular embodiments, a lidar system 100 may be configured to sense, identify, or determine distances to one or more targets 130 within a field of regard. As an example, a lidar system 100 may determine a distance to a target 130, where all or part of the target 130 is contained within a field of regard of the lidar system 100. All or part of a target 130 being contained within a FOR of the lidar system 100 may refer to the FOR overlapping, encompassing, or enclosing at least a portion of the target 130. In particular embodiments, target 130 may include all or part of an object that is moving or stationary relative to lidar system 100. As an example, target 130 may include all or a portion of a person, vehicle, motorcycle, truck, train, bicycle, wheelchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects. In particular embodiments, a target may be referred to as an object.

In particular embodiments, light source 110, scanner 120, and receiver 140 may be packaged together within a single housing, where a housing may refer to a box, case, or enclosure that holds or contains all or part of a lidar system 100. As an example, a lidar-system enclosure may contain a light source 110, mirror 115, scanner 120, and receiver 140 of a lidar system 100. Additionally, the lidar-system enclosure may include a controller 150. The lidar-system enclosure may also include one or more electrical connections for conveying electrical power or electrical signals to or from the enclosure. In particular embodiments, one or more components of a lidar system 100 may be located remotely from a lidar-system enclosure. As an example, all or part of light source 110 may be located remotely from a lidar-system enclosure, and pulses of light produced by the light source 110 may be conveyed to the enclosure via optical fiber. As another example, all or part of a controller 150 may be located remotely from a lidar-system enclosure.

In particular embodiments, light source 110 may include an eye-safe laser, or lidar system 100 may be classified as an eye-safe laser system or laser product. An eye-safe laser, laser system, or laser product may refer to a system that includes a laser with an emission wavelength, average power, peak power, peak intensity, pulse energy, beam size, beam divergence, exposure time, or scanned output beam such that emitted light from the system presents little or no possibility of causing damage to a person's eyes. As an example, light source 110 or lidar system 100 may be classified as a Class 1 laser product (as specified by the 60825-1 standard of the International Electrotechnical Commission (IEC)) or a Class I laser product (as specified by Title 21, Section 1040.10 of the United States Code of Federal Regulations (CFR)) that is safe under all conditions of normal use. In particular embodiments, lidar system 100 may be an eye-safe laser product (e.g., with a Class 1 or Class I classification) configured to operate at any suitable wavelength between approximately 900 nm and approximately 2100 nm. As an example, lidar system 100 may include a laser with an operating wavelength between approximately 1400 nm and approximately 1600 nm, and the laser or the lidar system 100 may be operated in an eye-safe manner. As another example, lidar system 100 may be an eye-safe laser product that includes a scanned laser with an operating wavelength between approximately 1530 nm and approximately 1560 nm. As another example, lidar system 100 may be a Class 1 or Class I laser product that includes a laser diode, fiber laser, or solid-state laser with an operating wavelength between approximately 1400 nm and approximately 1600 nm.

In particular embodiments, one or more lidar systems 100 may be integrated into a vehicle. As an example, multiple lidar systems 100 may be integrated into a car to provide a complete 360-degree horizontal FOR around the car. As another example, 4-10 lidar systems 100, each system having a 45-degree to 90-degree horizontal FOR, may be combined together to form a sensing system that provides a point cloud covering a 360-degree horizontal FOR. The lidar systems 100 may be oriented so that adjacent FORs have an amount of spatial or angular overlap to allow data from the multiple lidar systems 100 to be combined or stitched together to form a single or continuous 360-degree point cloud. As an example, the FOR of each lidar system 100 may have approximately 1-15 degrees of overlap with an adjacent FOR. In particular embodiments, a vehicle may refer to a mobile machine configured to transport people or cargo. For example, a vehicle may include, may take the form of, or may be referred to as a car, automobile, motor vehicle, truck, bus, van, trailer, off-road vehicle, farm vehicle, lawn mower, construction equipment, forklift, robot, golf cart, motorhome, taxi, motorcycle, scooter, bicycle, skateboard, train, snowmobile, watercraft (e.g., a ship or boat), aircraft (e.g., a fixed-wing aircraft, helicopter, or dirigible), unmanned aerial vehicle (e.g., drone), or spacecraft. In particular embodiments, a vehicle may include an internal combustion engine or an electric motor that provides propulsion for the vehicle.

In particular embodiments, one or more lidar systems 100 may be included in a vehicle as part of an advanced driver assistance system (ADAS) to assist a driver of the vehicle in the driving process. For example, a lidar system 100 may be part of an ADAS that provides information or feedback to a driver (e.g., to alert the driver to potential problems or hazards) or that automatically takes control of part of a vehicle (e.g., a braking system or a steering system) to avoid collisions or accidents. A lidar system 100 may be part of a vehicle ADAS that provides adaptive cruise control, automated braking, automated parking, collision avoidance, alerts the driver to hazards or other vehicles, maintains the vehicle in the correct lane, or provides a warning if an object or another vehicle is in a blind spot.

In particular embodiments, one or more lidar systems 100 may be integrated into a vehicle as part of an autonomous-vehicle driving system. As an example, a lidar system 100 may provide information about the surrounding environment to a driving system of an autonomous vehicle. An autonomous-vehicle driving system may include one or more computing systems that receive information from a lidar system 100 about the surrounding environment, analyze the received information, and provide control signals to the vehicle's driving systems (e.g., steering wheel, accelerator, brake, or turn signal). As an example, a lidar system 100 integrated into an autonomous vehicle may provide an autonomous-vehicle driving system with a point cloud every 0.1 seconds (e.g., the point cloud has a 10 Hz update rate, representing 10 frames per second). The autonomous-vehicle driving system may analyze the received point clouds to sense or identify targets 130 and their respective locations, distances, or speeds, and the autonomous-vehicle driving system may update control signals based on this information. As an example, if lidar system 100 detects a vehicle ahead that is slowing down or stopping, the autonomous-vehicle driving system may send instructions to release the accelerator and apply the brakes.

In particular embodiments, an autonomous vehicle may be referred to as an autonomous car, driverless car, self-driving car, robotic car, or unmanned vehicle. In particular embodiments, an autonomous vehicle may refer to a vehicle configured to sense its environment and navigate or drive with little or no human input. As an example, an autonomous vehicle may be configured to drive to any suitable location and control or perform all safety-critical functions (e.g., driving, steering, braking, parking) for the entire trip, with the driver not expected to control the vehicle at any time. As another example, an autonomous vehicle may allow a driver to safely turn their attention away from driving tasks in particular environments (e.g., on freeways), or an autonomous vehicle may provide control of a vehicle in all but a few environments, requiring little or no input or attention from the driver.

In particular embodiments, an autonomous vehicle may be configured to drive with a driver present in the vehicle, or an autonomous vehicle may be configured to operate the vehicle with no driver present. As an example, an autonomous vehicle may include a driver's seat with associated controls (e.g., steering wheel, accelerator pedal, and brake pedal), and the vehicle may be configured to drive with no one seated in the driver's seat or with little or no input from a person seated in the driver's seat. As another example, an autonomous vehicle may not include any driver's seat or associated driver's controls, and the vehicle may perform substantially all driving functions (e.g., driving, steering, braking, parking, and navigating) without human input. As another example, an autonomous vehicle may be configured to operate without a driver (e.g., the vehicle may be configured to transport human passengers or cargo without a driver present in the vehicle). As another example, an autonomous vehicle may be configured to operate without any human passengers (e.g., the vehicle may be configured for transportation of cargo without having any human passengers onboard the vehicle).

Although this disclosure describes or illustrates example embodiments of lidar systems 100 or light sources 110 that produce light waveforms that include pulses of light, the embodiments described or illustrated herein may also be applied to other types of light waveforms, including continuous-wave (CW) light or modulated light waveforms. For example, a lidar system 100 as described or illustrated herein may include a light source 110 configured to produce pulses of light. Alternatively, a lidar system 100 may be configured to act as a frequency-modulated continuous-wave (FMCW) lidar system and may include a light source 110 configured to produce CW light or a frequency-modulated light waveform.

A pulsed lidar system is one type of lidar system 100 in which the light source 110 emits ranging pulses of light, and the distance to a remote target 130 is determined from the time-of-flight for a ranging pulse of light to travel to the target 130 and back. Another type of lidar system 100 is a frequency-modulated lidar system, which may be referred to as a frequency-modulated continuous-wave (FMCW) lidar system. A FMCW lidar system uses frequency-modulated light to determine the distance to a remote target 130 based on a modulation frequency of the received light (which is scattered from a remote target) relative to the modulation frequency of the emitted light. For example, for a linearly chirped light source (e.g., a frequency modulation that produces a linear change in frequency with time), the larger the frequency difference between the emitted light and the received light, the farther away the target 130 is located. The frequency difference can be determined by mixing the received light with a portion of the emitted light (e.g., by coupling the two beams onto a detector, or mixing analog electric signals corresponding to the received light and the emitted light) and determining the resulting beat frequency. For example, the electrical signal from an APD can be analyzed using a fast Fourier transform (FFT) technique to determine the frequency difference between the emitted light and the received light.

If a linear frequency modulation m (e.g., in units of Hz/s) is applied to a CW laser, then the distance D from the target 130 to the lidar system 100 may be expressed as $D = c \cdot \Delta f/(2m)$, where c is the speed of light and $\Delta f$ is the difference in frequency between the transmitted light and the received light. For example, for a linear frequency modulation of $10^{12}$ Hz/s (or, 1 MHz/µs), if a frequency difference of 330 kHz is measured, then the distance to the target is approximately 50 meters. Additionally, a frequency difference of 1.33 MHz corresponds to a target located approximately 200 meters away.

The light source 110 for a FMCW lidar system can be a fiber laser (e.g., a seed laser diode followed by one or more optical amplifiers) or a direct-emitter laser diode. The seed laser diode or the direct-emitter laser diode can be operated in a CW manner (e.g., by driving the laser diode with a substantially constant DC current), and the frequency modulation can be provided by an external modulator (e.g., an electro-optic phase modulator). Alternatively, the frequency modulation can be produced by applying a DC bias current along with a current modulation to the seed laser diode or the direct-emitter laser diode. The current modulation produces a corresponding refractive-index modulation in the laser diode, which results in a frequency modulation of the light emitted by the laser diode. The current-modulation component (and corresponding frequency modulation) can have any suitable frequency or shape (e.g., piecewise linear, sinusoidal, triangle-wave, or sawtooth).

Figure 2:
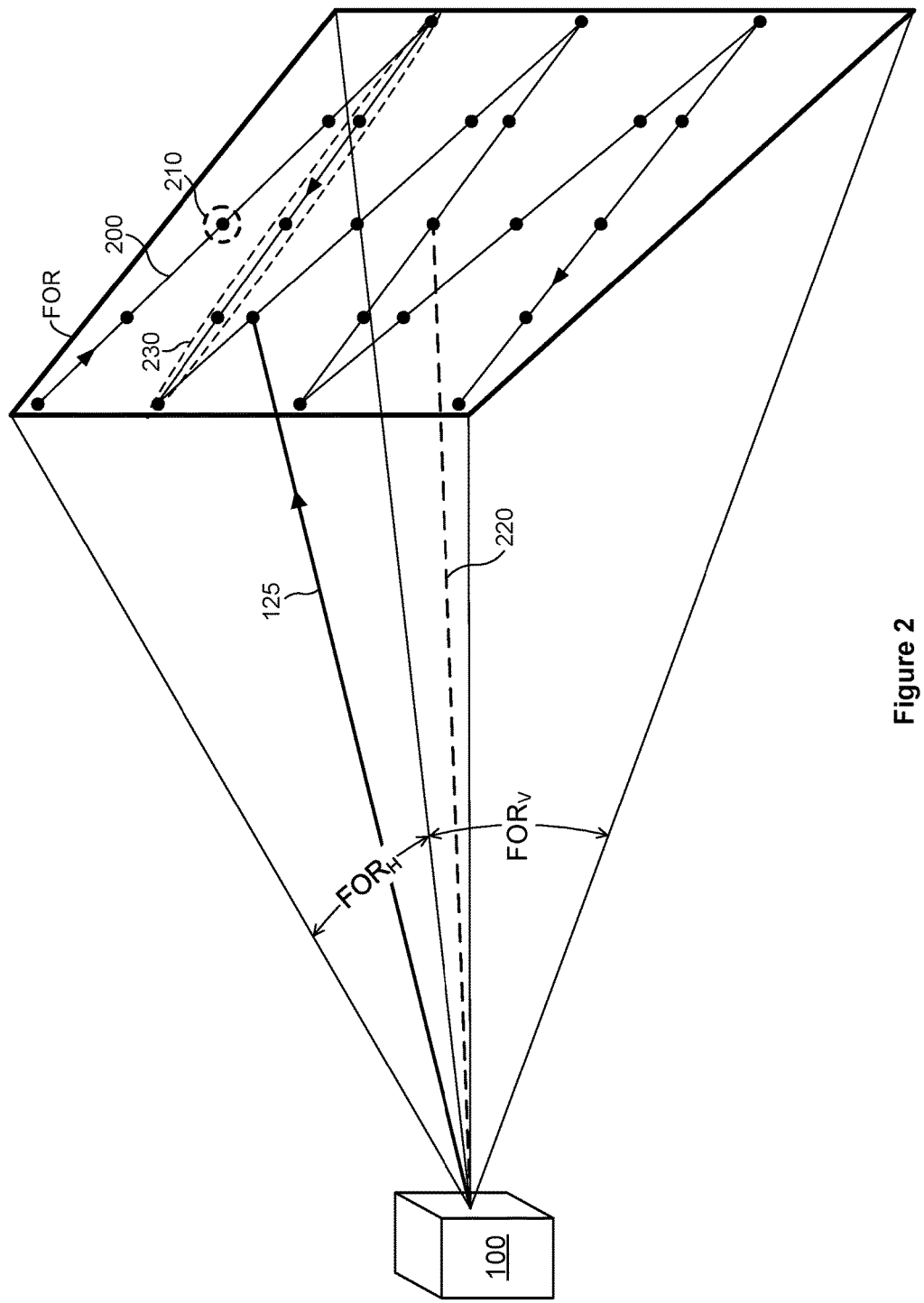
FIG. 2 illustrates an example scan pattern produced by a lidar system.

FIG. 2 illustrates an example scan pattern 200 produced by a lidar system 100. A scan pattern 200 (which may be referred to as an optical scan pattern, optical scan path, scan path, or scan) may represent a path or course followed by output beam 125 as it is scanned across all or part of a FOR. Each traversal of a scan pattern 200 may correspond to the capture of a single frame or a single point cloud. In particular embodiments, a lidar system 100 may be configured to scan output optical beam 125 along one or more particular scan patterns 200. In particular embodiments, a scan pattern 200 may scan across any suitable field of regard (FOR) having any suitable horizontal FOR (FOR$_H$) and any suitable vertical FOR (FOR$_V$). For example, a scan pattern 200 may have a field of regard represented by angular dimensions (e.g., FOR$_H$×FOR$_V$) 40°×30°, 90°×40°, or 60°×15°. As another example, a scan pattern 200 may have a FOR$_H$ greater than or equal to 10°, 25°, 30°, 40°, 60°, 90°, or 120°. As another example, a scan pattern 200 may have a FOR$_V$ greater than or equal to 2°, 5°, 10°, 15°, 20°, 30°, or 45°.

In the example of FIG. 2, reference line 220 represents a center of the field of regard of scan pattern 200. In particular embodiments, reference line 220 may have any suitable orientation, such as for example, a horizontal angle of 0° (e.g., reference line 220 may be oriented straight ahead) and a vertical angle of 0° (e.g., reference line 220 may have an inclination of 0°), or reference line 220 may have a nonzero horizontal angle or a nonzero inclination (e.g., a vertical angle of +10° or −10°). In FIG. 2, if the scan pattern 200 has a 60°×15° field of regard, then scan pattern 200 covers a ±30° horizontal range with respect to reference line 220 and a ±7.5° vertical range with respect to reference line 220. Additionally, optical beam 125 in FIG. 2 has an orientation of approximately −15° horizontal and +3° vertical with respect to reference line 220. Optical beam 125 may be referred to as having an azimuth of −15° and an altitude of +3° relative to reference line 220. In particular embodiments, an azimuth (which may be referred to as an azimuth angle) may represent a horizontal angle with respect to reference line 220, and an altitude (which may be referred to as an altitude angle, elevation, or elevation angle) may represent a vertical angle with respect to reference line 220.

In particular embodiments, a scan pattern 200 may include multiple pixels 210, and each pixel 210 may be associated with one or more laser pulses or one or more distance measurements. Additionally, a scan pattern 200 may include multiple scan lines 230, where each scan line represents one scan across at least part of a field of regard, and each scan line 230 may include multiple pixels 210. Alternatively, a scan pattern 200 may include multiple individually targeted pixels 210 where each pixel 210 corresponds to a pulse of light directed into a particular part of a field of regard. In FIG. 2, scan line 230 includes five pixels 210 and corresponds to an approximately horizontal scan across the FOR from right to left, as viewed from the lidar system 100. In particular embodiments, a cycle of scan pattern 200 may include a total of $P_x \times P_y$ pixels 210 (e.g., a two-dimensional distribution of $P_x$ by $P_y$ pixels). As an example, scan pattern 200 may include a distribution with dimensions of approximately 100-2,000 pixels 210 along a horizontal direction and approximately 4-400 pixels 210 along a vertical direction. As another example, scan pattern 200 may include a distribution of 1,000 pixels 210 along the horizontal direction by 64 pixels 210 along the vertical direction (e.g., the frame size is 1000×64 pixels) for a total of 64,000 pixels per cycle of scan pattern 200. In particular embodiments, the number of pixels 210 along a horizontal direction may be referred to as a horizontal resolution of scan pattern 200, and the number of pixels 210 along a vertical direction may be referred to as a vertical resolution. As an example, scan pattern 200 may have a horizontal resolution of greater than or equal to 100 pixels 210 and a vertical resolution of greater than or equal to 4 pixels 210. As another example, scan pattern 200 may have a horizontal resolution of 100-2,000 pixels 210 and a vertical resolution of 4-400 pixels 210.

In particular embodiments, each pixel 210 may be associated with a distance (e.g., a distance to a portion of a target 130 from which an associated laser pulse was scattered) or one or more angular values. As an example, a pixel 210 may be associated with a distance value and two angular values (e.g., an azimuth and altitude) that represent the angular location of the pixel 210 with respect to the lidar system 100. A distance to a portion of target 130 may be determined based at least in part on a time-of-flight measurement for a corresponding pulse. An angular value (e.g., an azimuth or altitude) may correspond to an angle (e.g., relative to reference line 220) of output beam 125 (e.g., when a corresponding pulse is emitted from lidar system 100) or an angle of input beam 135 (e.g., when an input signal is received by lidar system 100). In particular embodiments, an angular value may be determined based at least in part on a position of a component of scanner 120. As an example, an azimuth or altitude value associated with a pixel 210 may be determined from an angular position of one or more corresponding scanning mirrors of scanner 120.

Figure 3:
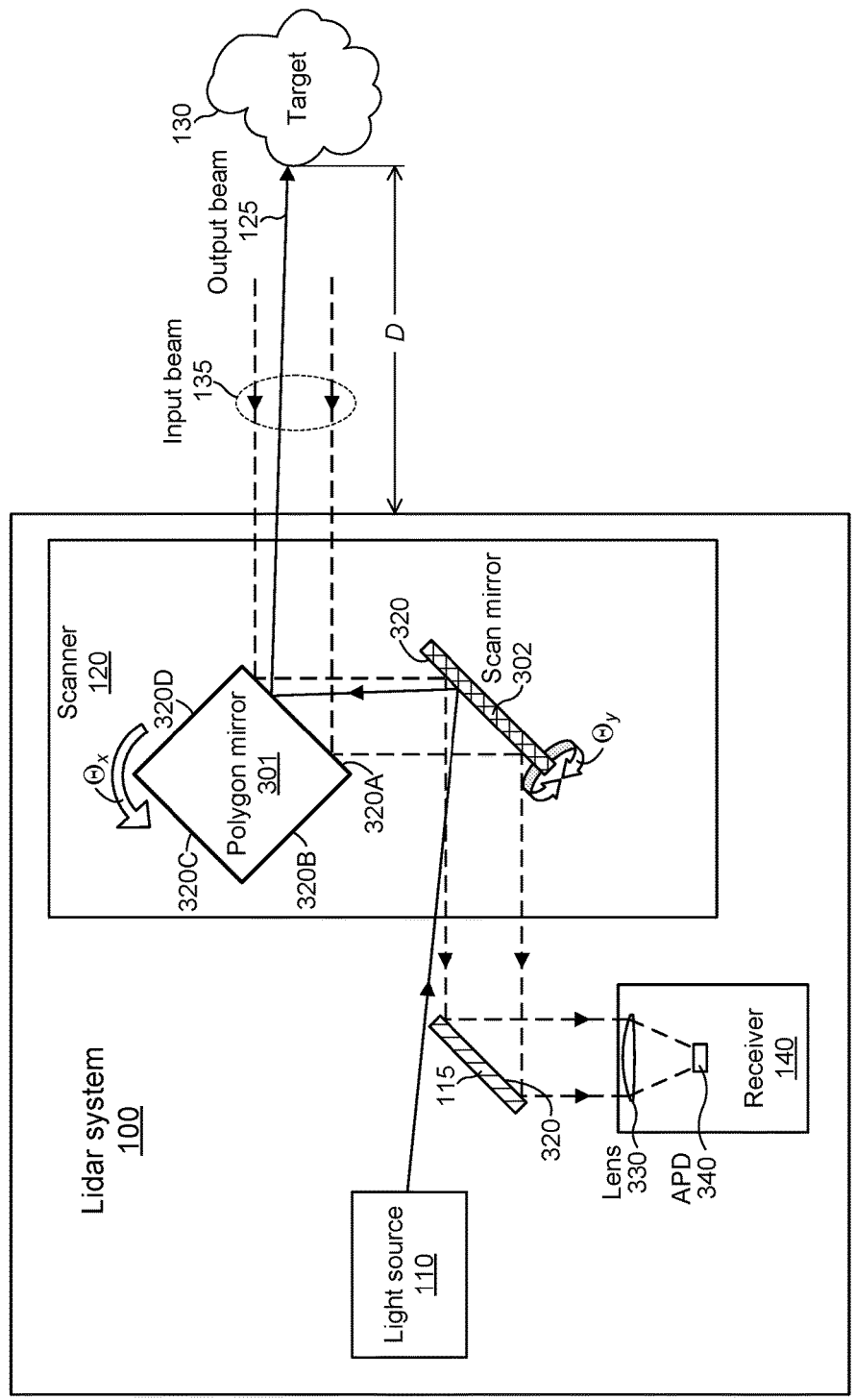
FIG. 3 illustrates an example lidar system with an example rotating polygon mirror.

FIG. 3 illustrates an example lidar system 100 with an example rotating polygon mirror 301. In particular embodiments, a scanner 120 may include a polygon mirror 301 configured to scan output beam 125 along a particular direction. In the example of FIG. 3, scanner 120 includes two scanning mirrors: (1) a polygon mirror 301 that rotates along the Θ$_x$ direction And (2) a scanning mirror 302 that oscillates back and forth along the Θ$_y$ direction. The output beam 125 from light source 110, which passes alongside mirror 115, is reflected by reflecting surface 320 of scan mirror 302 and is then reflected by a reflecting surface (e.g., surface 320A, 320B, 320C, or 320D) of polygon mirror 301. Scattered light from a target 130 returns to the lidar system 100 as input beam 135. The input beam 135 reflects from polygon mirror 301, scan mirror 302, and mirror 115, which directs input beam 135 through focusing lens 330 and to the APD 340 of receiver 140. A reflecting surface 320 (which may be referred to as a reflective surface) may include a reflective metallic coating (e.g., gold, silver, or aluminum) or a reflective dielectric coating, and the reflecting surface 320 may have any suitable reflectivity R at an operating wavelength of the light source 110 (e.g., R greater than or equal to 70%, 80%, 90%, 95%, 98%, or 99%).

In particular embodiments, a polygon mirror 301 may be configured to rotate along a $\Theta_x$ or $\Theta_y$ direction and scan output beam 125 along a substantially horizontal or vertical direction, respectively. A rotation along a Ox direction may refer to a rotational motion of mirror 301 that results in output beam 125 scanning along a substantially horizontal direction. Similarly, a rotation along a $\Theta_y$ direction may refer to a rotational motion that results in output beam 125 scanning along a substantially vertical direction. In FIG. 3, mirror 301 is a polygon mirror that rotates along the $\Theta_x$ direction and scans output beam 125 along a substantially horizontal direction, and mirror 302 pivots along the $\Theta_y$ direction and scans output beam 125 along a substantially vertical direction. In particular embodiments, a polygon mirror 301 may be configured to scan output beam 125 along any suitable direction. As an example, a polygon mirror 301 may scan output beam 125 at any suitable angle with respect to a horizontal or vertical direction, such as for example, at an angle of approximately 0°, 10°, 20°, 30°, 45°, 60°, 70°, 80°, or 90° with respect to a horizontal or vertical direction.

In particular embodiments, a polygon mirror 301 may refer to a multi-sided object having reflective surfaces 320 on two or more of its sides or faces. As an example, a polygon mirror may include any suitable number of reflective faces (e.g., 2, 3, 4, 5, 6, 7, 8, or 10 faces), where each face includes a reflective surface 320. A polygon mirror 301 may have a cross-sectional shape of any suitable polygon, such as for example, a triangle (with three reflecting surfaces 320), square (with four reflecting surfaces 320), pentagon (with five reflecting surfaces 320), hexagon (with six reflecting surfaces 320), heptagon (with seven reflecting surfaces 320), or octagon (with eight reflecting surfaces 320). In FIG. 3, the polygon mirror 301 has a substantially square cross-sectional shape and four reflecting surfaces (320A, 320B, 320C, and 320D). The polygon mirror 301 in FIG. 3 may be referred to as a square mirror, a cube mirror, or a four-sided polygon mirror. In FIG. 3, the polygon mirror 301 may have a shape similar to a cube, cuboid, or rectangular prism. Additionally, the polygon mirror 301 may have a total of six sides, where four of the sides include faces with reflective surfaces (320A, 320B, 320C, and 320D).

In particular embodiments, a polygon mirror 301 may be continuously rotated in a clockwise or counter-clockwise rotation direction about a rotation axis of the polygon mirror 301. The rotation axis may correspond to a line that is perpendicular to the plane of rotation of the polygon mirror 301 and that passes through the center of mass of the polygon mirror 301. In FIG. 3, the polygon mirror 301 rotates in the plane of the drawing, and the rotation axis of the polygon mirror 301 is perpendicular to the plane of the drawing. An electric motor may be configured to rotate a polygon mirror 301 at a substantially fixed frequency (e.g., a rotational frequency of approximately 1 Hz (or 1 revolution per second), 10 Hz, 50 Hz, 100 Hz, 500 Hz, or 1,000 Hz). As an example, a polygon mirror 301 may be mechanically coupled to an electric motor (e.g., a synchronous electric motor) which is configured to spin the polygon mirror 301 at a rotational speed of approximately 160 Hz (or, 9600 revolutions per minute (RPM)).

In particular embodiments, output beam 125 may be reflected sequentially from the reflective surfaces (320A, 320B, 320C, and 320D) as the polygon mirror 301 is rotated. This results in the output beam 125 being scanned along a particular scan axis (e.g., a horizontal or vertical scan axis) to produce a sequence of scan lines, where each scan line corresponds to a reflection of the output beam 125 from one of the reflective surfaces of the polygon mirror 301. In FIG. 3, the output beam 125 reflects off of reflective surface 320A to produce one scan line. Then, as the polygon mirror 301 rotates, the output beam 125 reflects off of reflective surfaces 320B, 320C, and 320D to produce a second, third, and fourth respective scan line.

Figure 4:
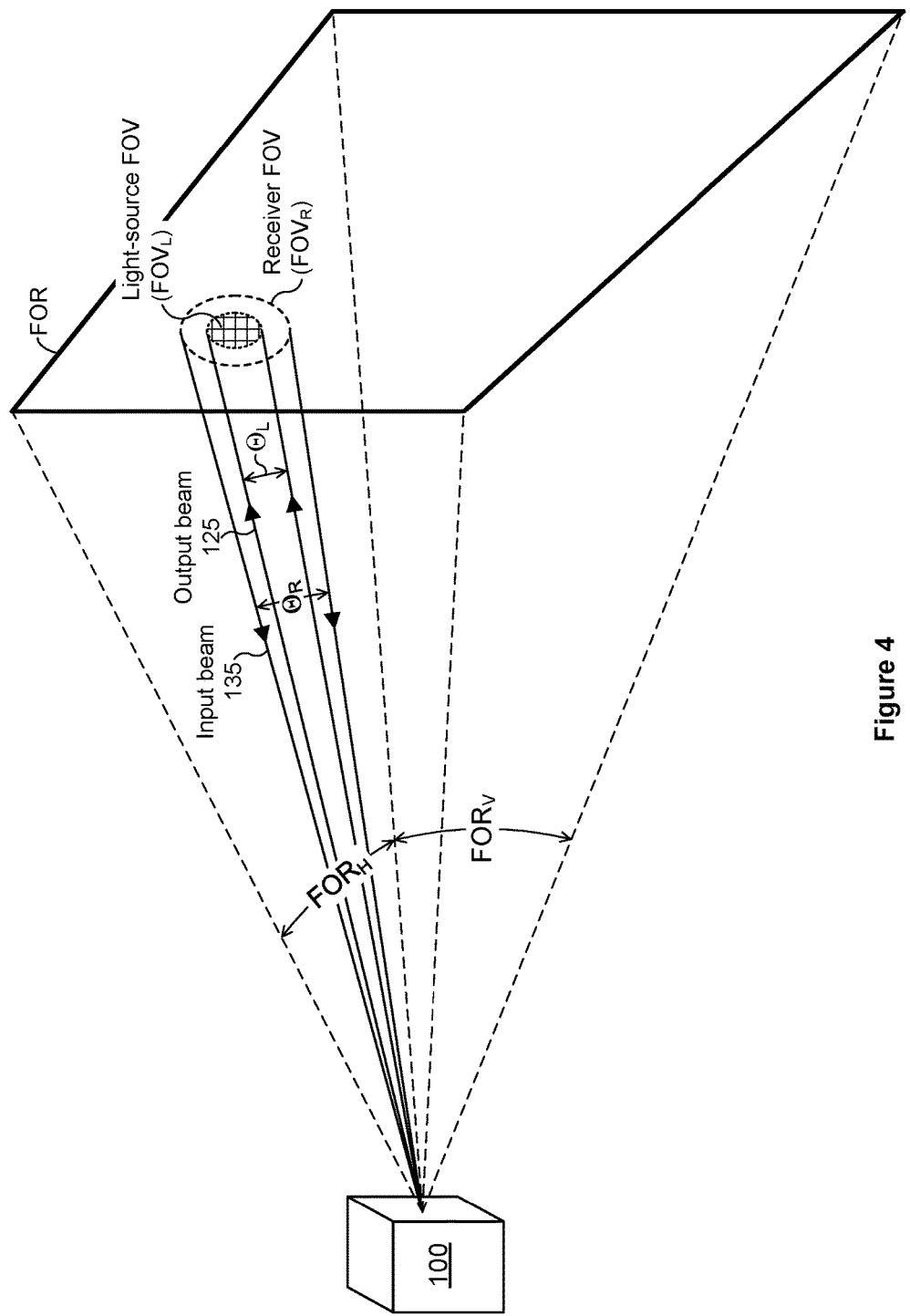
FIG. 4 illustrates an example light-source field of view ($FOV_L$) and receiver field of view ($FOV_R$) for a lidar system.

FIG. 4 illustrates an example light-source field of view ($FOV_L$) and receiver field of view ($FOV_R$) for a lidar system 100. A light source 110 of lidar system 100 may emit pulses of light as the $FOV_L$ and $FOV_R$ are scanned by scanner 120 across a field of regard (FOR). In particular embodiments, a light-source field of view may refer to an angular cone illuminated by the light source 110 at a particular instant of time. Similarly, a receiver field of view may refer to an angular cone over which the receiver 140 may receive or detect light at a particular instant of time, and any light outside the receiver field of view may not be received or detected. As an example, as the light-source field of view is scanned across a field of regard, a portion of a pulse of light emitted by the light source 110 may be sent downrange from lidar system 100, and the pulse of light may be sent in the direction that the $FOV_L$ is pointing at the time the pulse is emitted. The pulse of light may scatter off a target 130, and the receiver 140 may receive and detect a portion of the scattered light that is directed along or contained within the $FOV_R$.

In particular embodiments, scanner 120 may be configured to scan both a light-source field of view and a receiver field of view across a field of regard of the lidar system 100. Multiple pulses of light may be emitted and detected as the scanner 120 scans the $FOV_L$ and $FOV_R$ across the field of regard of the lidar system 100 while tracing out a scan pattern 200. In particular embodiments, the light-source field of view and the receiver field of view may be scanned synchronously with respect to one another, so that as the $FOV_L$ is scanned across a scan pattern 200, the $FOV_R$ follows substantially the same path at the same scanning speed. Additionally, the $FOV_L$ and $FOV_R$ may maintain the same relative position to one another as they are scanned across the field of regard. As an example, the $FOV_L$ may be substantially overlapped with or centered inside the $FOV_R$ (as illustrated in FIG. 4), and this relative positioning between $FOV_L$ and $FOV_R$ may be maintained throughout a scan. As another example, the $FOV_R$ may lag behind the $FOV_L$ by a particular, fixed amount throughout a scan (e.g., the $FOV_R$ may be offset from the $FOV_L$ in a direction opposite the scan direction).

In particular embodiments, the $FOV_L$ may have an angular size or extent $\Theta_L$ that is substantially the same as or that corresponds to the divergence of the output beam 125, and the $FOV_R$ may have an angular size or extent $\Theta_R$ that corresponds to an angle over which the receiver 140 may receive and detect light. In particular embodiments, the receiver field of view may be any suitable size relative to the light-source field of view. As an example, the receiver field of view may be smaller than, substantially the same size as, or larger than the angular extent of the light-source field of view. In particular embodiments, the light-source field of view may have an angular extent of less than or equal to 50 milliradians, and the receiver field of view may have an angular extent of less than or equal to 50 milliradians. The $FOV_L$ may have any suitable angular extent $\Theta_L$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. Similarly, the $FOV_R$ may have any suitable angular extent $\Theta_R$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. In particular embodiments, the light-source field of view and the receiver field of view may have approximately equal angular extents. As an example, $\Theta_L$ and $\Theta_R$ may both be approximately equal to 1 mrad, 2 mrad, or 4 mrad. In particular embodiments, the receiver field of view may be larger than the light-source field of view, or the light-source field of view may be larger than the receiver field of view. As an example, $\Theta_L$ may be approximately equal to 3 mrad, and $\Theta_R$ may be approximately equal to 4 mrad. As another example, $\Theta_R$ may be approximately L times larger than $\Theta_L$, where L is any suitable factor, such as for example, 1.1, 1.2, 1.5, 2, 3, 5, or 10.

In particular embodiments, a pixel 210 may represent or may correspond to a light-source field of view or a receiver field of view. As the output beam 125 propagates from the light source 110, the diameter of the output beam 125 (as well as the size of the corresponding pixel 210) may increase according to the beam divergence $\Theta_L$. As an example, if the output beam 125 has a $\Theta_L$ of 2 mrad, then at a distance of 100 m from the lidar system 100, the output beam 125 may have a size or diameter of approximately 20 cm, and a corresponding pixel 210 may also have a corresponding size or diameter of approximately 20 cm. At a distance of 200 m from the lidar system 100, the output beam 125 and the corresponding pixel 210 may each have a diameter of approximately 40 cm.

Figure 5:
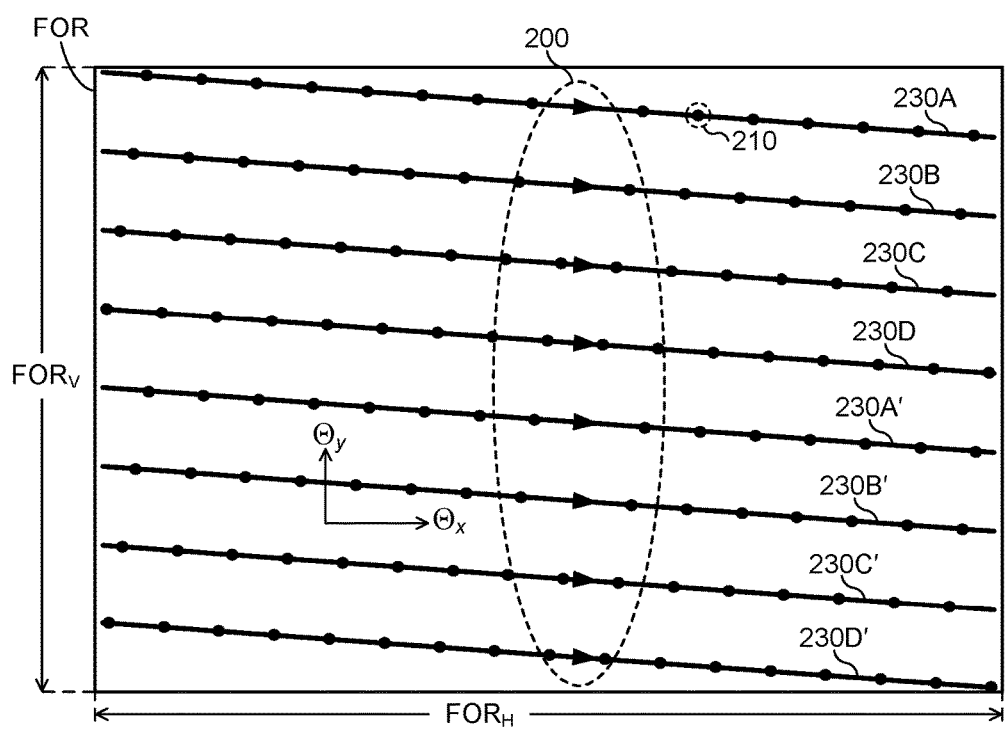
FIG. 5 illustrates an example unidirectional scan pattern that includes multiple pixels and multiple scan lines.

FIG. 5 illustrates an example unidirectional scan pattern 200 that includes multiple pixels 210 and multiple scan lines 230. In particular embodiments, scan pattern 200 may include any suitable number of scan lines 230 (e.g., approximately 1, 2, 5, 10, 20, 50, 100, 500, or 1,000 scan lines), and each scan line 230 of a scan pattern 200 may include any suitable number of pixels 210 (e.g., 1, 2, 5, 10, 20, 50, 100, 200, 500, 1,000, 2,000, or 5,000 pixels). The scan pattern 200 illustrated in FIG. 5 includes eight scan lines 230, and each scan line 230 includes approximately 16 pixels 210. In particular embodiments, a scan pattern 200 where the scan lines 230 are scanned in two directions (e.g., alternately scanning from right to left and then from left to right) may be referred to as a bidirectional scan pattern 200, and a scan pattern 200 where the scan lines 230 are scanned in the same direction may be referred to as a unidirectional scan pattern 200. The scan pattern 200 in FIG. 5 may be referred to as a unidirectional scan pattern 200 where each scan line 230 travels across the FOR in substantially the same direction (e.g., approximately from left to right as viewed from the lidar system 100). In particular embodiments, scan lines 230 of a unidirectional scan pattern 200 may be directed across a FOR in any suitable direction, such as for example, from left to right, from right to left, from top to bottom, from bottom to top, or at any suitable angle (e.g., at a 0°, 5°, 10°, 30°, or 45° angle) with respect to a horizontal or vertical axis. In particular embodiments, each scan line 230 in a unidirectional scan pattern 200 may be a separate line that is not directly connected to a previous or subsequent scan line 230.

In particular embodiments, a unidirectional scan pattern 200 may be produced by a scanner 120 that includes a polygon mirror (e.g., polygon mirror 301 of FIG. 3), where each scan line 230 is associated with a particular reflective surface 320 of the polygon mirror. As an example, reflective surface 320A of polygon mirror 301 in FIG. 3 may produce scan line 230A in FIG. 5. Similarly, as the polygon mirror 301 rotates, reflective surfaces 320B, 320C, and 320D may successively produce scan lines 230B, 230C, and 230D, respectively. Additionally, for a subsequent revolution of the polygon mirror 301, the scan lines 230A', 230B', 230C', and 230D' may be successively produced by reflections of the output beam 125 from reflective surfaces 320A, 320B, 320C, and 320D, respectively. In particular embodiments, N successive scan lines 230 of a unidirectional scan pattern 200 may correspond to one full revolution of a N-sided polygon mirror. As an example, the four scan lines 230A, 230B, 230C, and 230D in FIG. 5 may correspond to one full revolution of the four-sided polygon mirror 301 in FIG. 3. Additionally, a subsequent revolution of the polygon mirror 301 may produce the next four scan lines 230A', 230B', 230C', and 230D' in FIG. 5.

Figure 6:
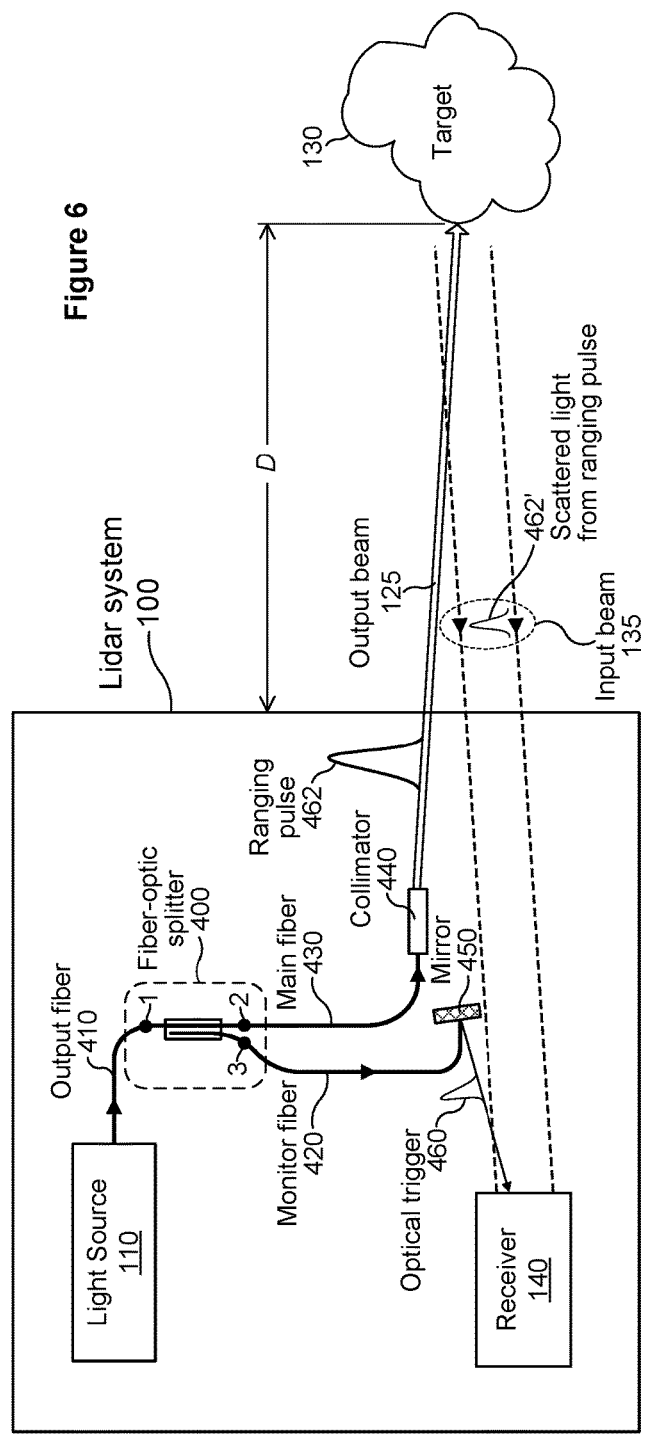
FIG. 6 illustrates an example lidar system with an optical trigger.

FIG. 6 illustrates an example lidar system 100 with an optical trigger 460. In particular embodiments, a lidar system 100 with an optical trigger 460 may refer to a lidar system 100 that uses an optical trigger pulse 460 to determine a time at which a corresponding ranging pulse 462 is emitted. An optical trigger 460 may refer to a pulse of light that is split off from a ranging pulse of light 462 and sent to a receiver 140 of a lidar system 100. For example, the light source 110 in FIG. 6 may be a pulsed laser that emits a ranging pulse of light 462 via output optical fiber 410. A portion of the ranging pulse 462 may be split off by an optical splitter 400 to produce an optical trigger pulse 460 that is directed to a receiver 140 of the lidar system 100. After the optical trigger pulse 460 is split off, the remaining portion of the ranging pulse 462 may be directed, as part of a free-space output beam 125, into a field of regard of the lidar system 100. As another example, the light source 110 in FIG. 6 may emit multiple ranging pulses of light which are scanned (e.g., as an output beam 125) by a scanner 120 across the field of regard of the lidar system 100. The ranging pulses 462 may be scanned as a series of scan lines 230 or as multiple individually targeted pixels 210. Prior to the ranging pulses being sent to the scanner 120, a portion of each ranging pulse may be split off to produce an optical trigger 460. An optical trigger 460 may be referred to as a trigger pulse of light, an optical trigger pulse, a trigger pulse, or a trigger.

In particular embodiments, a fiber-optic splitter 400 may be a three-port fiber-optic component that includes an input-fiber port (port 1), a main output-fiber port (port 2), and a monitor output-fiber or tap output-fiber port (port 3). The input fiber may receive a ranging pulse from an output fiber 410 of light source 110. The fiber-optic splitter 400 may split off a portion of the ranging pulse to produce a trigger pulse 460, which is directed to a receiver 140 via the monitor fiber 420. Once the trigger pulse 460 has been split off, the main output fiber 430 may receive the ranging pulse 462 and direct the ranging pulse 462 to a collimator 440, which produces a free-space output beam 125. A fiber-optic splitter 400 may be referred to as an optical splitter, a splitter, a fiber-optic tap coupler, a tap coupler, an optical tap, a fiber tap, or a tap. Additionally, splitting off a portion of a pulse of light (e.g., splitting off a portion of a ranging pulse 462 to produce a trigger pulse 460) may be referred to a tapping off a portion of the pulse of light.

In the example of FIG. 6, the fiber-optic splitter 400 includes three fiber-optic ports: an input port (port 1), a main output port (port 2), and a monitor or tap output port (port 3). The emitted pulses from light source 110 are coupled from the output fiber 410 into the splitter 400 via the input port (e.g., the output fiber 410 may be spliced to an input fiber of the splitter 400). A portion of each ranging pulse received at the input port is split off by the splitter 400 to produce the optical trigger pulse 460, which is sent out of the splitter 400 via the monitor fiber 420. The remaining part of the ranging pulse propagates to the main output port and then along the main output fiber 430.

In particular embodiments, an optical splitter 400 may be configured to split off less than or equal to 10% of an energy of a ranging pulse of light 462 to produce a trigger pulse 460. As an example, the optical splitter 400 in FIG. 6 may tap off between approximately 0.1% and approximately 10% of the energy of a received pulse of light to produce a trigger pulse 460. Additionally, the remaining approximately 90% to approximately 99.9% of the energy of the received optical pulse may continue along to the main fiber 430 as a ranging pulse 462. As another example, an optical splitter 400 may tap off approximately 0.0001%, 0.001%, 0.01%, 0.1%, 0.2%, 0.5%, 1%, 2%, 5%, or 10% of the energy of a received pulse of light. As another example, an optical splitter 400 may be a 1% fiber-optic tap coupler configured to tap off approximately 1% of the energy of a received pulse of light while the remaining 99% of the pulse continues along to the main fiber 430 as the ranging pulse 462. For an input pulse with a 1-µJ energy sent into a 1% tap coupler, approximately 10 nJ of the pulse may be split off to produce the trigger pulse 460, and the remaining approximately 0.99 µJ of pulse energy may propagate to the main fiber 430 as the ranging pulse 462.

In particular embodiments, an optical splitter 400 may be combined with an optical attenuator so that less than or equal to 1% of the energy of a received pulse of light is directed to the receiver 140. For example, an optical splitter 400 and an optical attenuator may be configured to produce a trigger pulse 460 with less than 0.1% of the energy of a ranging pulse 462. The optical attenuator may be used to reduce the pulse energy of the trigger pulse 460 to avoid saturating the receiver 140. As another example, an optical splitter 400 may split off 0.1% of the energy of a received pulse of light, and an optical attenuator may attenuate the split off pulse by 20 dB (e.g., by a factor of 100) so that approximately 0.001% of the energy of the received pulse of light is coupled to the monitor fiber 420. The optical attenuator may be a fiber-optic attenuator located at or near port 3 of the optical splitter 400 or located along the monitor fiber 420. An optical attenuator may include an offset fiber splice (e.g., two optical fibers spliced together so their cores are misaligned to reduce the optical coupling between the two fibers) or an attenuating optical fiber (e.g., an optical fiber doped with a material that absorbs light or an optical fiber configured to leak light out of the core). Additionally, a length of standard optical fiber (e.g., a single-mode or multi-mode optical fiber with low optical loss or absorption) may be located after the optical attenuator to remove light propagating in the cladding.

In particular embodiments, a fiber-optic splitter 400 may be located after a light source 110 and before a collimator 440 that produces a free-space output beam 125. In the example of FIG. 6, the fiber-optic splitter 400 is located between the light source 110 and the collimator 440. A portion of each ranging pulse of light emitted by the light source 110 is split off by the fiber-optic splitter 400 prior to the ranging pulse of light 462 being emitted by the collimator 440 as part of the free-space output beam 125. In particular embodiments, a trigger pulse of light 460 may be split off from a ranging pulse 462 prior to the ranging pulse being emitted as a free-space output beam 125 or prior to the ranging pulse being directed into a field of regard of a lidar system 100. In the example of FIG. 6, the trigger pulse of light 460 is split off from the ranging pulse 462 before the ranging pulse is emitted as part of the free-space output beam 125 and before the ranging pulse is directed out of the lidar system 100.

In particular embodiments, a lidar system 100 may include a light source 110 configured to emit a ranging pulse of light 462 that is directed into a field of regard of the lidar system 100. The lidar system 100 may include a scanner 120 configured to receive the ranging pulse 462 after a trigger pulse 460 has been split off by an optical splitter 400. As an example, an output beam 125 that includes a ranging pulse 462 may propagate through a scanner 120 that directs the ranging pulse 462 into a field of regard of the lidar system 100. The scanner 120 may be located after an optical splitter 400 so that the trigger pulse 460 is split off from the ranging pulse 462 prior to the ranging pulse 462 being sent to the scanner 120. As another example, a light source 110 may emit multiple ranging pulses 462, and a scanner 120 may scan at least a portion of the emitted ranging pulses 462 across a field of regard of a lidar system 100. The scanner 120 may be located after an optical splitter 400 so that trigger pulses 460 are split off before the ranging pulses 462 are directed to the scanner 120. The scanner 120 may receive a free-space output beam 125 that includes the multiple ranging pulses 462 after the corresponding trigger pulses 460 have been split off from the ranging pulses 462 by the optical splitter 400.

In FIG. 6, light source 110 may be a pulsed light source that emits pulses of light which are coupled from the light source 110 to the optical splitter 400 via output fiber 410. The output fiber 410, monitor fiber 420, or main fiber 430 may each include any suitable type of optical fiber. In particular embodiments, an optical fiber, which may be referred to as a fiber-optic cable, a fiber, an optical link, a fiber-optic link, or a fiber link, may convey, carry, transport, or transmit light from one optical component to another. An optical fiber may include single-mode (SM) fiber, large-mode-area (LMA) fiber, multi-mode (MM) fiber, coreless fiber, polarization-maintaining (PM) fiber, photonic-crystal or photonic-bandgap fiber, gain fiber (e.g., rare-earth-doped optical fiber for use in an optical amplifier), multi-clad fiber (e.g., a double-clad fiber having a core, inner cladding, and outer cladding), or any other suitable optical fiber, or any suitable combination thereof. As an example, monitor fiber 420 may include a SM fiber with a core diameter of approximately 8 µm and a cladding diameter of approximately 125 µm. As another example, main fiber 430 may include a MM fiber that is coupled to, attached to, or terminated at an output collimator 440. An output collimator 440 may include a spherical or aspheric lens or a graded-index lens (GRIN lens) that receives light from an optical fiber and produces a free-space optical beam 125. In FIG. 6, the main fiber 430 may convey ranging pulses 462 from the optical splitter 400 to the output collimator 440, and the output collimator 440 may produce a collimated free-space optical beam 125 that includes the ranging pulses 462.

In particular embodiments, the optical splitter 400 may be a fiber-optic component. A fiber-optic component or a fiber-coupled optical component may refer to an optical component configured to receive input light via one or more optical fibers or produce output light via one or more optical fibers. As an example, a fiber-optic splitter 400 may be a three-port fiber-optic component with an input optical fiber, a tap optical-fiber output (e.g., monitor fiber 420), and a primary output fiber (e.g., main fiber 430). As another example, a fiber-coupled laser diode may include a laser diode that produces light that is coupled into an optical fiber.

In particular embodiments, a lidar system 100 may include a receiver 140 configured to (1) detect light from a trigger pulse of light 460 and (2) detect scattered light 462' from a corresponding ranging pulse 462. The scattered light 462', which may be part of an input beam 135 directed to the receiver 140, may include light from a ranging pulse 462 that is emitted into a field of regard of the lidar system 100 and scattered by a remote target 130. For example, an emitted ranging pulse 462 may have a pulse energy of approximately 500 nJ, and the scattered light pulse 462' detected by the receiver 140 may have a pulse energy of approximately 5 fJ (e.g., the scattered light pulse 462' has approximately $10^{-8}$ of the energy of the ranging pulse 462). In particular embodiments, a receiver 140 may include a single detector for detecting both a trigger pulse 460 and a scattered ranging pulse 462'. As an example, a receiver 140 may include an APD configured to (1) detect light from an optical trigger pulse 460 directed to the receiver 140 and (2) detect, at a later time, light from a scattered ranging pulse 462'. For each detected optical pulse, the receiver 140 may produce an electrical signal (e.g., an electrical pulse or edge) that corresponds to the detected optical pulse or that corresponds to a time at which the optical pulse was detected. In particular embodiments, a receiver 140 may include two detectors. For example, a receiver 140 may include one detector (e.g., a PIN photodiode) that detects light from an optical trigger pulse 460 and another detector (e.g., an APD) that detects light from a scattered ranging pulse 462'. The PIN photodiode and APD may be located in the same package or housing of the receiver 140, or the PIN photodiode and APD may be located in separate packages or housings.

In particular embodiments, a trigger pulse 460 may be directed to a receiver 140 by an optical fiber (e.g., monitor fiber 460). As an example, an optical fiber may convey a trigger pulse 460 from an optical splitter 400 to the receiver 140. The end of the optical fiber may be cleaved or polished to emit a diverging beam directed into or toward the receiver 140, or the optical fiber may be terminated by a lens that produces a focused or collimated beam directed into or toward the receiver 140. Alternatively, the end of the optical fiber may be shaped, tapered, or rounded to act as a lens (e.g., the end of the optical fiber may be lensed using a fiber-optic fusion splicer), or the end of the optical fiber may include a thermally expanded core (TEC) or a coreless fiber. A TEC or coreless fiber may allow light propagating in the fiber to diverge before reaching a lensed end of the optical fiber. As another example, an optical fiber (e.g., monitor fiber 420) may convey a trigger pulse 460 at least part of the way to a receiver 140. In FIG. 6, the monitor fiber 420 conveys the trigger pulse 460 from the optical splitter 400 to a mirror 450. The mirror 450 receives the trigger pulse 460 from the end of the monitor fiber 420 (which may be cleaved, polished, terminated by a lens, or lensed) and reflects the trigger pulse 460 to direct it to the receiver 140.

In particular embodiments, a lidar system 100 with an optical trigger 460 may exhibit a reduced amount of timing jitter compared to a lidar system that uses an electrical trigger. For example, other lidar systems may use an electrical trigger signal that is provided by a processor or a light source of the lidar system, and timing jitter or timing inaccuracy associated with the electrical trigger signal may cause inaccurate distance measurements. As an example, an electrical trigger signal with a timing error of 2 ns may be associated with a range-measurement error of approximately 30 cm. In the example of FIG. 6, the receiver 140 receives a split-off portion of the emitted ranging pulse 462, and the receiver 140 generates a corresponding electrical signal (e.g., an electrical pulse or edge) that is directly derived from the ranging pulse 462. This optically derived trigger signal may have less timing error than an electrically derived trigger signal since the optical trigger 460 may not be subject to electrical noise or timing errors that may arise from the electrical circuitry in a processor or light source. Additionally, the optical trigger 460 and the scattered light 462' may be detected using the same detector (and its associated electrical circuitry), which may reduce timing error associated with transmitting or processing signals using different circuits. For example, in a lidar system with an electrical trigger signal, the trigger signal and the optical-input signal may be generated, transmitted, or processed using different circuitry, which may lead to additional timing error between the two signals.

Figure 7:
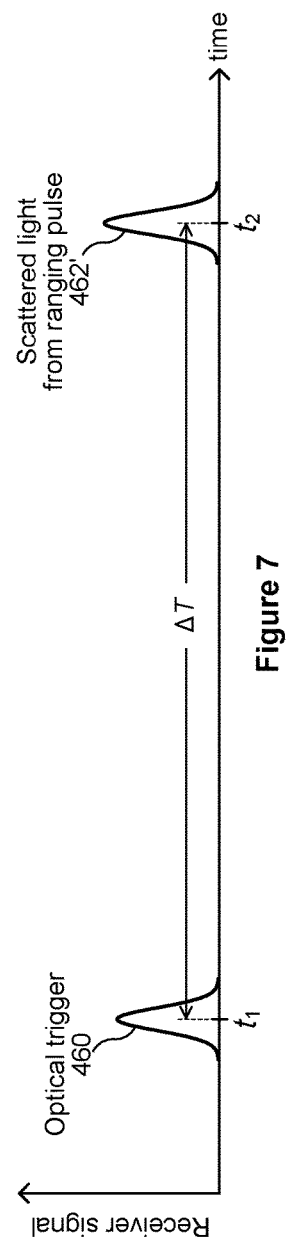
FIG. 7 illustrates an example receiver signal for the lidar system of FIG. 6.

FIG. 7 illustrates an example receiver signal for the lidar system of FIG. 6. In particular embodiments, a lidar system 100 may include a receiver 140 configured to detect at least a portion of a trigger pulse 460, and after detecting the trigger pulse 460, the receiver 140 may detect a scattered pulse 462' that includes light from a ranging pulse 462 scattered by a target 130. The trigger pulse 460 may include light from the ranging pulse 462 that was split off from the ranging pulse 462 prior to the ranging pulse 462 being directed into the field of regard of the lidar system 100. The lidar system 100 may also include a processor (e.g., controller 150 in FIG. 1) configured to determine the distance from the lidar system 100 to the target 130 based at least in part on the time when the trigger pulse 460 was detected and the time when the scattered pulse 462' was detected.

The receiver signal illustrated in FIG. 7 may correspond to or may represent the optical pulses detected by the receiver 140 in FIG. 6. At time $t_1$, the receiver 140 detects the optical trigger pulse 460, and at a later time $t_2$ (subsequent to $t_1$), the receiver 140 detects the scattered light 462' from the ranging pulse which is scattered by a target 130. The target 130 may be located a distance D from the lidar system 100, and the distance may be determined based at least in part on time $t_1$ (the time when the optical trigger pulse 460 was detected) and time $t_2$ (the time when the scattered light pulse 462' was detected). For example, a processor may receive the times $t_1$ and $t_2$ from the receiver 140 and may determine the distance D using the expression $D=c \cdot (t_2-t_1)/2$. As another example, rather than receiving two values corresponding to the two times ($t_1$ and $t_2$), the processor may receive one value corresponding to $\Delta T$, the elapsed time between when the two pulses were detected (e.g., $\Delta T = t_2 - t_1$). The processor may determine the distance D using the expression $D=c \cdot \Delta T/2$. Alternatively, the distance D may be determined from an expression $D=c \cdot (t_2-t_1)/2-\Delta d$ or $D=(c \cdot \Delta T/2)-\Delta d$, where $\Delta d$ is a distance-correction factor that accounts for a fixed offset distance between the ranging pulse 462 and the optical trigger 460. For example, if the ranging pulse 462 travels an additional 15 cm of distance within the lidar system 100 before being emitted into the field of regard (compared to the distance traveled by the optical trigger 460 from the splitter 400 to the receiver 140), then a distance-correction factor of $\Delta d=15$ cm may be applied to the expression for determining D. A distance-correction factor may also be expressed as a time-correction factor $\Delta t$ that corresponds to a fixed offset time between the ranging pulse 462 and the optical trigger 460. The distance-correction factor may be related to the time-correction factor by the expression $\Delta d = c \cdot \Delta t$, and the distance D may be determined from an expression $D=c \cdot (t_2-t_1)/2 - c \cdot \Delta t$ or $D=(c \cdot \Delta T/2) - c \cdot \Delta t$. For example, a time-correction factor of 0.5 ns (which indicates that the ranging pulse 462 is delayed with respect to the optical trigger 460 by 0.5 ns) may correspond to a distance-correction factor of 15 cm.

In particular embodiments, detecting an optical pulse may refer to a receiver 140 receiving a pulse of light and producing an analog or digital electrical signal corresponding to the received pulse of light. As an example, detecting the optical trigger pulse 460 may include an APD of the receiver 140 receiving the trigger pulse 460 and producing an electrical-current pulse corresponding to the optical trigger pulse 460. The receiver 140 may include a transimpedance amplifier that converts the electrical-current pulse into a voltage pulse and a voltage amplifier that amplifies the voltage pulse. Additionally, the transimpedance amplifier or voltage amplifier may include an electronic filter (e.g., a bandpass filter, a low-pass filter, or a high-pass filter) that filters the current or voltage signal to remove noise. The amplified voltage pulse may be sent to a comparator that produces an electrical-edge signal (e.g., a rising edge or a falling edge) if the voltage pulse exceeds a particular threshold voltage, which indicates the receipt of a valid optical pulse. Alternatively, the amplified voltage pulse may be sent to multiple comparators in parallel, where each comparator has a different threshold voltage, or the amplified voltage pulse may be sent to an analog-to-digital converter (ADC) that produces a digital representation of the voltage pulse. One or more electrical-edge signals (from one or more corresponding comparators) or a digital signal from an ADC may be sent to a timer circuit that determines a time-of-receipt for the optical pulse. For example, the timer circuit may be a time-to-digital converter (TDC) that begins timing when the optical trigger 460 is detected and stops timing when a scattered light pulse 462' is detected. The TDC may produce two digital values corresponding to the two times ($t_1$ and $t_2$), or the TDC may produce one digital value corresponding to $\Delta T$, the elapsed time between detection of the two pulses.

FIG. 8 illustrates an example lidar system 100 that includes a diffuser 452 and an optical-delay fiber 500. A diffuser 452 (which may include or may be referred to as an optical diffuser, transmissive diffuser, reflective diffuser, diffuse reflector, or Lambertian scattering material) may scatter incident light over a range of angles (e.g. over an angular cone having a full-angle size of approximately 30°, 45°, 60°, 90°, 120°, or 180°), and a portion of the scattered light may be received by a receiver 140. In particular embodiments, a lidar system 100 may include an optical diffuser 452 configured to receive an optical trigger pulse 460 from an optical splitter 400 and scatter or diffuse the optical trigger pulse 460 over an angular range so that at least a portion of the optical trigger pulse 460 is directed toward a receiver 140. As an example, the optical trigger pulse 460 may be spread out over a 90-degree angular cone, and the receiver 140 may receive and detect approximately 0.1-10% of the scattered optical trigger pulse 460. In FIG. 8, the optical trigger pulse 460 is split off by the fiber-optic splitter 400 and conveyed to the diffuser 452 by the monitor fiber 420. The end of the monitor fiber 420 may be cleaved, polished, or terminated by a lens to produce a diverging, focused, or collimated beam. The diffuser 452 scatters the optical trigger pulse 460, and a portion of the scattered optical trigger 460 may be detected by the receiver 140. As an example, for an optical trigger pulse 460 with a pulse energy of 5 nJ, the receiver 140 may receive and detect approximately 5 pJ to 0.5 nJ of energy from the optical trigger pulse 460. Since a diffuser 452 scatters light over a range of angles, the angular alignment requirements for a diffuser 452 may be less critical than the angular alignment requirements for mirror 450 in FIG. 6. As an example, if the orientation of a diffuser 452 changes by 10 degrees, a portion of the optical trigger pulse 460 may still be directed toward the receiver 140 since the light from the optical trigger pulse 460 is distributed over a range of angles.

In particular embodiments, a diffuser 452 may be a transmissive diffuser or a reflective diffuser. A transmissive diffuser may be configured to transmit incident light and scatter or diffuse the transmitted light over a range of angles. A transmissive diffuser may be made from a diffuse-transmittance material (e.g., ceramic, ground glass, or a glass-ceramic such as MACOR) that transmits and scatters incident light. A reflective diffuser, as illustrated in FIG. 8, may be configured to reflect incident light and scatter or diffuse the reflected light over a range of angles so that at least a portion of the scattered light is directed toward the receiver 140. A reflective diffuser may be made from a diffuse-reflectance material (e.g., SPECTRALON or ACCU-FLECT) that reflects incident light in a non-specular manner so that the incident light is scattered over a range of angles.

In particular embodiments, a lidar system 100 may include an optical-delay fiber configured to temporally delay a ranging pulse 462 with respect to a corresponding optical trigger pulse 460. The optical-delay fiber 500 may include a length of optical fiber located after an optical splitter 400 so that the ranging pulse 462 propagates through the length of optical fiber after the trigger pulse 460 is split off from the ranging pulse 462. In FIG. 8, the main output fiber 430 of the fiber-optic splitter 400 is coupled to the delay fiber 500 which delays the ranging pulse 462 with respect to the optical trigger pulse 460 by an amount of time based at least in part on the length of the delay fiber 500. Advancing the optical trigger pulse 460 in time with respect to the ranging pulse 462 may provide a clean optical trigger pulse 460 that is not distorted by or combined with internally scattered light 520 from the ranging pulse 462. An optical-delay fiber 500 may provide a temporal delay of the ranging pulse 462 with respect to the optical trigger pulse 460 of between approximately 1 ns and approximately 200 ns. For example, a delay fiber 500 may have any suitable length (e.g., 1 m, 2 m, 3 m, 5 m, 10 m, 20 m, 30 m, or 40 m) and may produce any suitable temporal delay (e.g., 5 ns, 10 ns, 15 ns, 25 ns, 50 ns, 100 ns, 150 ns, or 200 ns) between the ranging pulse 462 and the optical trigger 460. As another example, a delay fiber 500 may have a length of approximately 20 m, which results in a temporal delay for the ranging pulse 462 of approximately 100 ns with respect to the optical trigger 500 (assuming a refractive index for the delay fiber of approximately 1.5).

In particular embodiments, for a lidar system with a delay fiber 500, the distance D to a remote target 130 may be determined from an expression $D = c \cdot (t_2 - t_1)/2 - \Delta d$ or $D = (c \cdot \Delta T/2) - \Delta d$, and the distance-correction factor $\Delta d$ may account for the temporal delay of the ranging pulse that is provided by the delay fiber 500. For example, if $\Delta T$ (the time between detection of the scattered light 462' and the optical trigger 460) is 500 ns and the distance-correction factor $\Delta d$ is 10 m, then the distance D is approximately 65 m. A 10-m distance-correction factor indicates that the ranging pulse has a 10-m distance delay with respect to the optical trigger 460. For example, a delay fiber 500 with a length of approximately 6.67 m and a refractive index of approximately 1.5 may provide a distance delay of approximately 10 m. A 10-m distance-correction factor corresponds to a time-correction factor $\Delta t$ of approximately 33.3 ns, which indicates that the ranging pulse is delayed by approximately 33.3 ns with respect to the optical trigger pulse 460. The expression for the distance D may also be written in terms of the time-correction factor Δt as $D = c \cdot (t_2 - t_1)/2 - c \cdot \Delta t$ or $D = (c \cdot \Delta T/2) - c \cdot \Delta t$. For example, if ΔT is 500 ns and the time-correction factor Δt is 33.3 ns, then the distance D is approximately 65 m.

FIG. 9 illustrates an example receiver signal for the lidar system of FIG. 8. The receiver signal illustrated in FIG. 9 may correspond to or may represent the optical pulses detected by the receiver 140 in FIG. 8. In particular embodiments, in addition to detecting a trigger pulse 460 at time $t_1$ and a corresponding scattered pulse 462' at a later time $t_2$, a receiver 140 may be configured to detect internally scattered light 520 from the ranging pulse 462. The internal scatter 520 may be produced by a portion of the ranging pulse 462 scattering from one or more surfaces within the lidar system 100 prior to the ranging pulse 462 being emitted into the field of regard of the lidar system 100. The internal scatter 520 may be detected at time $t_s$, which occurs after time $t_1$ and prior to time $t_2$. In the example of FIG. 8, the internal scatter 520 is produced by a portion of the ranging pulse being scattered from a window 510 of the lidar system 100. The window 510 may be configured to transmit light at the wavelength of the ranging pulse 462 (which is the same as the wavelength of the scattered light 462' from the ranging pulse). The window 510 may have an antireflection coating on one or both of its surfaces so that the window 510 is substantially transparent to the output beam 125 (which includes the emitted ranging pulse 462) and the input beam 135 (which includes the received scattered light pulse 462'). As an example, the window 510 may transmit approximately 99% of the incident light in the ranging pulse 462, and approximately 1% of the ranging pulse 462 may be reflected, scattered, or absorbed by the window 510. If the ranging pulse has a pulse energy of 1 μJ, then approximately 10 nJ of the pulse energy may be reflected, scattered, or absorbed by the window 510, and a portion of that 10-nJ energy may be detected by the receiver 140 as an internally scattered pulse 520.

The time gap between detection of the optical trigger pulse 460 and detection of the internal scatter pulse 520 may be expressed as $(t_s - t_1)$ and may correspond at least in part to the length of the delay fiber 500. For example, for a time gap $(t_s - t_1)$ of 51 ns, approximately 50 ns may be associated with a 10-m length of the delay fiber 500 and the remaining 1 ns of time gap may be associated with an additional distance of approximately 30 cm traveled by the ranging pulse 462 within the lidar system. By sending the ranging pulse 462 through a delay fiber 500, the internally scattered pulse 520 may be temporally delayed with respect to the optical trigger pulse 460. This may provide a clean, background-free optical trigger pulse 460 that is separated temporally from additional background light so that the time $t_1$ may be determined more accurately than in the presence of background light that may distort the optical trigger pulse 460. In a lidar system 100 without an optical delay 500, the internal scatter 520 from within the lidar system 100 may reach the receiver 140 with little or no temporal delay with respect to the optical trigger 460, and the lidar system 100 may not be able to differentiate between the optical trigger 460 and the internal scatter 520.

In addition to providing a clean optical trigger pulse 460, the delay fiber may allow the receiver 140 to separately detect an internally scattered pulse 520 that is scattered from the window 510. In particular embodiments, detecting light scattered by the window 510 may allow the lidar system 100 to determine whether there is a problem with the window 510. For example, based on the characteristics of a detected internally scattered pulse 520, a processor of the lidar system 100 may be configured to determine whether the window 510 is clean or dirty. The lidar system 100 may determine that at least a portion of the window 510 is blocked or obscured (e.g., by dust, dirt, mud, water, snow, oil, or bugs) and needs to be cleaned. Additionally or alternatively, the lidar system 100 may be configured to determine that the window 510 is cracked or damaged and is in need or repair or replacement. In particular embodiments, one or more characteristics of the light scattered by the window 510 may change if the window is obscured or damaged. As an example, if a region of the window 510 is obscured by dirt or mud, the amplitude of the internally scattered pulse 520 from that region of the window 510 may change (relative to light scattered from a clean region of the window 510) or a rise-time, fall-time, or pulse duration of the internally scattered pulse 520 may change. As another example, if one or more internally scattered pulses 520 exhibit an increase in amplitude or an increase in pulse duration beyond a particular threshold value, then a processor of the lidar system 100 may determine that the window 510 is obscured or damaged. In response to determining that the window 510 is obscured or damaged, the processor may send a notification that the window 510 needs to be cleaned or repaired. As an example, in response to detecting an increase in the amplitude of the internally scattered pulse 520, a processor may determine that the window 510 is obscured, and the processor may send a notification to a lidar system controller or a vehicle controller that the window 510 needs to be cleaned.

In particular embodiments, a light source 110 of a lidar system 100 may include a direct-emitter laser diode configured to emit pulses of light. A direct-emitter laser diode (which may be referred to as a direct emitter) may be configured to directly emit ranging pulses 462 which are coupled into an output fiber 410 and then directed to an optical splitter 400. A light source 110 that includes a direct-emitter laser diode may not include an optical amplifier, and the optical pulses produced by a direct-emitter laser diode may be emitted as ranging pulses 462 without being optically amplified. A direct-emitter laser diode may be driven by an electrical power source that supplies current pulses to the laser diode, and each current pulse may result in the emission of an optical pulse.

In particular embodiments, a light source 110 of a lidar system 100 may include a seed laser diode and a semiconductor optical amplifier (SOA). The seed laser diode may produce relatively low-energy ranging pulses 462 that are amplified by a SOA. For example, the SOA may include an active optical waveguide configured to receive a ranging pulse of light 462 from the seed laser diode and amplify the ranging pulse 462 as it propagates through the SOA waveguide. The amplified ranging pulse 462 may be coupled from the SOA into an output fiber 410, which directs the ranging pulse 462 to an optical splitter 400.

In particular embodiments, a light source 110 of a lidar system 100 may include a seed laser diode and an optical amplifier. For example, a light source 110 may include a seed laser diode configured to produce relatively low-energy ranging pulses 462 followed by one or more fiber-optic amplifier stages configured to amplify the ranging pulses 462. As another example, a seed laser may produce a ranging pulse 462 with a pulse energy of approximately 0.1 nJ, and an optical amplifier having one or more fiber-optic amplifier stages may amplify the ranging pulse 462 to a pulse energy of approximately 1 μJ. Each fiber-optic amplifier stage may include a length of optical-gain fiber that is doped with a gain material (e.g., erbium-doped gain fiber or erbium/ytterbium-doped gain fiber). The optical gain fiber may be pumped by one or more pump laser diodes, such as for example, a pump laser diode operating at 800-1000 nm. The pump-laser light excites the gain material, and the excited gain material provides optical gain to the ranging pulses 462 propagating through the gain fiber.

In particular embodiments, a light source 110 of a lidar system 100 may include a seed laser diode 600, an optical amplifier 610, and a fiber-optic splitter 400. Rather than having a fiber-optic splitter 400 located at the output of a light source 110 (e.g., as illustrated in FIG. 6 and FIG. 8), a fiber-optic splitter 400 may be located within a light source 110. The fiber-optic splitter 400 may split off a portion of a ranging pulse 462 from within the light source 110 to produce a trigger pulse 460, which may be directed to a receiver 140 of the lidar system 100.

Figure 10:
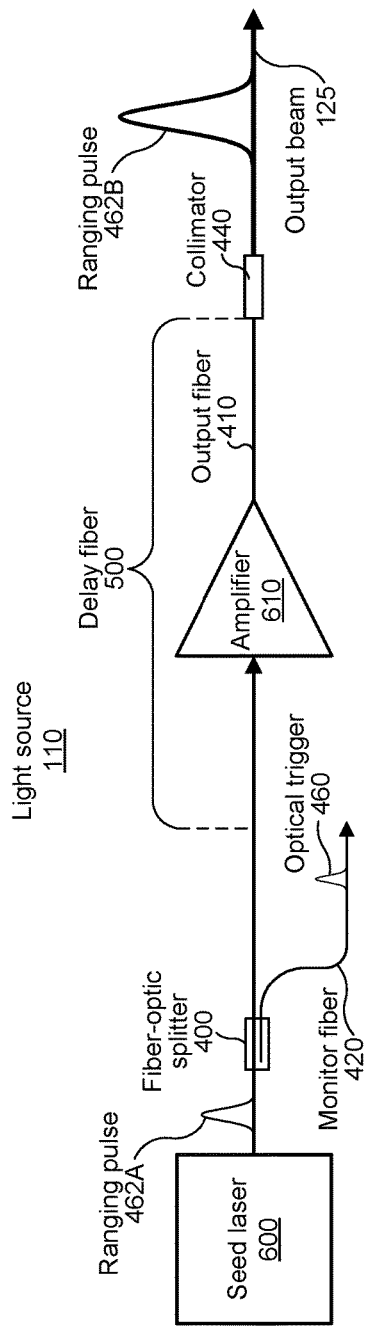
FIG. 10 illustrates an example light source that includes a fiber-optic splitter located between a seed laser and an optical amplifier.

FIG. 10 illustrates an example light source 110 that includes a fiber-optic splitter 400 located between a seed laser 600 and an optical amplifier 610. In particular embodiments, splitting off a portion of a ranging pulse 462 to produce a trigger pulse 460 may include splitting off the portion of a low-energy ranging pulse 462 produced by a seed laser 600 prior to the ranging pulse 462 being amplified by an optical amplifier 610. In FIG. 10, the fiber-optic splitter 400 receives a ranging pulse 462A emitted by the seed laser diode 600 and splits off a portion of the ranging pulse 462A to produce an optical trigger pulse 460, which may be directed to a receiver 140. The remaining part of the ranging pulse 462A continues along through the optical amplifier 610 where it is amplified and then directed to the output fiber 410 as an amplified ranging pulse 462B. The output fiber 410 is terminated by a collimator 440 that produces a free-space output beam 125 that includes the amplified ranging pulse 462B.

Figure 11:
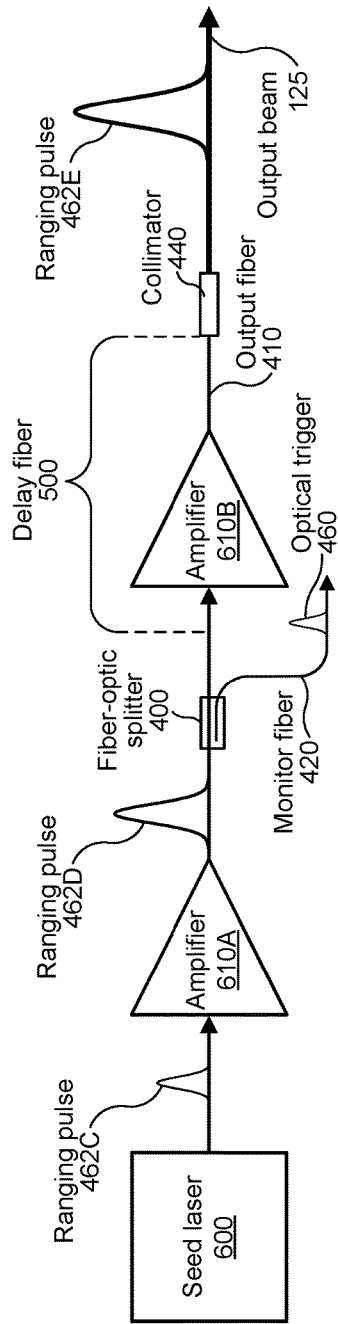
FIG. 11 illustrates an example light source that includes a fiber-optic splitter located between two amplifier stages.

FIG. 11 illustrates an example light source 110 that includes a fiber-optic splitter 400 located between two amplifier stages 610A and 610B. In particular embodiments, splitting off a portion of a ranging pulse 462 to produce a trigger pulse 460 may include splitting off the portion of a ranging pulse 462 at a location between two amplifier stages of a light source 110. The light source 110 in FIG. 11 includes a first amplifier stage 610A and a second amplifier stage 610B with an optical splitter 400 located between the two amplifier stages. The ranging pulse 462C from the seed laser 600 is partially amplified by the first amplifier stage 610A, and then the fiber-optic splitter 400 splits off a portion of the partially amplified ranging pulse 462D to produce an optical trigger pulse 460. The remaining part of the partially amplified ranging pulse 462D continues along where it is further amplified by the second amplifier stage 610B and then directed to the output fiber 410 as a fully amplified ranging pulse 462E. The output fiber 410 is terminated by a collimator 440 that produces a free-space output beam 125 that includes the fully amplified ranging pulse 462E.

In particular embodiments, an optical-delay fiber 500 may be included within a light source 110. As an example, rather than being a separate optical component located outside of a light source 110, a length of optical fiber within a light source 110 may act as an optical-delay fiber 500. In FIG. 8, the optical-delay fiber 500 is a discrete length of optical fiber located outside the light source 110, between the optical splitter 400 and the collimator 440. In FIGS. 10 and 11, one or more portions of optical fiber within the light source 110 may act as an optical-delay fiber 500. In FIG. 10, after a trigger pulse 460 is split off from the ranging pulse 462A, the ranging pulse 462A propagates through the amplifier 610 and the output fiber 410. The amplifier 610 may include a length of optical-gain fiber that, in addition to amplifying the ranging pulse 462A to produce the amplified ranging pulse 462B, acts as a delay fiber 500 that temporally delays the amplified ranging pulse 462B with respect to the trigger pulse 460. For example, the amplifier 610 in FIG. 10 may include a 20-m length of gain fiber that produces a 100-ns temporal delay between the ranging pulse 462B and the optical trigger pulse 460. Similarly, in FIG. 11, after a trigger pulse 460 is split off from the ranging pulse 462D, the ranging pulse 462D propagates through the second amplifier stage 610B and the output fiber 410. The amplifier 610B may include a length of optical-gain fiber that acts as a delay fiber 500 that delays the amplified ranging pulse 462E with respect to the trigger pulse 460. For example, the second amplifier stage 610B in FIG. 11 may include a 10-m length of gain fiber that produces a temporal delay of approximately 50 ns.

In particular embodiments, a trigger pulse 460 may be produced from within a light source 110 even when a portion of the light source 110 is disabled. In the example of FIG. 10, disabling the light source 110 may include disabling the amplifier 610 by turning off or reducing the amount of pump-laser light provided by a pump laser diode to the gain material of amplifier 610. When the amplifier 610 is disabled, the light source 110 may produce no amplified ranging pulses 462B or may produce ranging pulses 462B with reduced pulse energy. The amplifier 610 may be disabled at particular times (e.g., between successive frames or between successive scan lines 230) to reduce the power consumption of the light source 110. Although the amplifier 610 may be disabled, the seed laser 600 may continue to produce ranging pulses 462A, and the corresponding trigger pulses 460 may sent to a receiver 140 for monitoring. The receiver 140 may be used to monitor the trigger pulses 460 to ensure that the seed laser 600 is working properly or to calibrate the ranging pulses 462A produced by the seed laser 600. In the example of FIG. 11, the second amplifier stage 610B may be disabled at particular times so that the light source 110 produces no ranging pulses 462E or produces ranging pulses 462E with reduced pulse energy. When the amplifier 610B is disabled, the seed laser 600 and first amplifier stage 610A may continue to operate (e.g., the seed laser 600 may produce ranging pulses 462C, which are amplified by the first amplifier stage 610A). The corresponding trigger pulses 460 may be sent to a receiver 140 for monitoring to ensure that the seed laser 600 and the first amplifier stage 610A are working properly or to calibrate the ranging pulses 462D.

FIG. 12 illustrates an example lidar system 100 with a receiver 140 that includes a feedthrough 680 for an optical trigger 460. In particular embodiments, an optical trigger pulse 460 may be conveyed to a receiver 140 via an optical fiber, and the receiver 140 may include a housing 650 with a feedthrough 680 configured to receive the trigger pulse 460 via the optical fiber. In FIG. 12, the monitor fiber 420 conveys the optical trigger pulse 460 to the receiver housing 650, and the monitor fiber 420 extends into the housing 650 through the feedthrough 680. The feedthrough 680 may include a hole or gap in the housing 650, and after the monitor fiber 420 is inserted into the hole or gap, the feedthrough 680 may be sealed using an adhesive or epoxy. A monitor fiber 420 may enter a housing 650 through any suitable side, back, or front surface. For example, a back surface of the receiver housing 650 may include a circuit board, and the monitor fiber 420 may be inserted into the receiver 140 via a feedthrough 680 in the circuit board.

In particular embodiments, an optical trigger 460 may be emitted into the interior of a receiver housing 650 from the end of a monitor fiber 420 as a diverging, focused, or collimated free-space optical beam. The end of the monitor fiber 420 may aim the free-space optical trigger 460 (1) directly at the APD 660, (2) toward a mirror that reflects the optical trigger 460 to the APD 660, or (3) toward a diffuser 452 that scatters the optical trigger 460. In particular embodiments, a receiver 140 may include an optical diffuser 452 that is located within or is part of a housing 650 that contains the receiver 140. In the example of FIG. 12, the receiver 140 includes a reflective optical diffuser 452 located within the housing 650, and the optical trigger 460 is emitted from the monitor fiber 420 as a diverging beam aimed toward the diffuser 452. The diffuser 452 scatters the optical trigger 460 so that at least a portion of the optical trigger 460 is directed to the APD 660.

In particular embodiments, a receiver housing 650 may include or may be made from an opaque material configured to reduce the amount of stray light incident on a detector (e.g., APD 660) of the receiver 140. The housing 650 in FIG. 12 may be made from an opaque material (e.g., a metal, plastic, or ceramic material) that blocks light, or the housing 650 may be painted or coated with an opaque material (e.g., an interior or exterior surface of the housing 650 may be painted with a black paint or may be black anodized). The housing 650 may include one or more openings or apertures that allow particular light signals to enter, and the rest of the housing 650 may remain opaque to unwanted incident light. In FIG. 12, the housing 650 includes a feedthrough 680 that allows the optical trigger 460 to enter and an opening for an input lens 670 that allows the input beam 135 to enter and focuses the input beam 135 onto the APD 660. Additionally, the housing 650 may block unwanted scattered or reflected stray light (e.g., scattered light produced by the collimator 440). An opaque housing 650 may reduce the amount of unwanted stray light that enters the receiver housing 650, which may reduce the amount of electrical noise produced by the APD 660 from detecting stray light.

In particular embodiments, a receiver housing 650 may include a baffled interior surface configured to reduce the amount of stray light that is incident on a detector (e.g., APD 660) of the receiver 140. For example, at least part of the interior surface of a housing 650 may include optical-baffling features, such as for example, a coating or a surface texture (e.g., a sawtooth structure) that blocks, diverts, or absorbs off-axis stray light. Off-axis stray light may be coupled into a receiver housing 650 through an input lens 670, and a sawtooth structure added to the interior walls of the housing may prevent most of the off-axis stray light from reaching the APD 660.

FIG. 13 illustrates an example receiver 140 that includes a transmissive optical diffuser 452. An optical trigger pulse 460 is conveyed to the housing by a monitor fiber 420 which is terminated at or near a transmissive optical diffuser 452. The diffuser 452 transmits and scatters the optical trigger pulse 460 into the interior of the housing 650 so that a portion of the scattered optical trigger pulse 460 is directed to the APD 660. In particular embodiments, an optical diffuser 452 may be a separate optical component, or an optical diffuser 452 may be part of a housing 650. For example, the optical diffuser in FIG. 13 may be a separate optical component (e.g., a glass-ceramic material) or a circuit board of the receiver 140 (e.g., a ceramic circuit board or an epoxy-laminate circuit board) that is attached to or located near an interior surface of the housing 650. As another example, at least a portion of a receiver housing 650 may be made from a material that acts as a transmissive diffuser (e.g., a glass-ceramic material or a circuit board that acts as a transmissive diffuser), and the feedthrough 680 may include a pocket in a side of the housing 650 that does not extend all the way through the housing wall. The end of the monitor fiber 420 may be terminated at or affixed to the pocket, and the optical trigger pulse 460 may be scattered into the receiver housing 650 by the housing material near the pocket. To prevent stray light from being transmitted through other parts of the housing 650, the exterior surface of the housing may be painted or coated with an opaque material that blocks the stray light.

Figure 14:
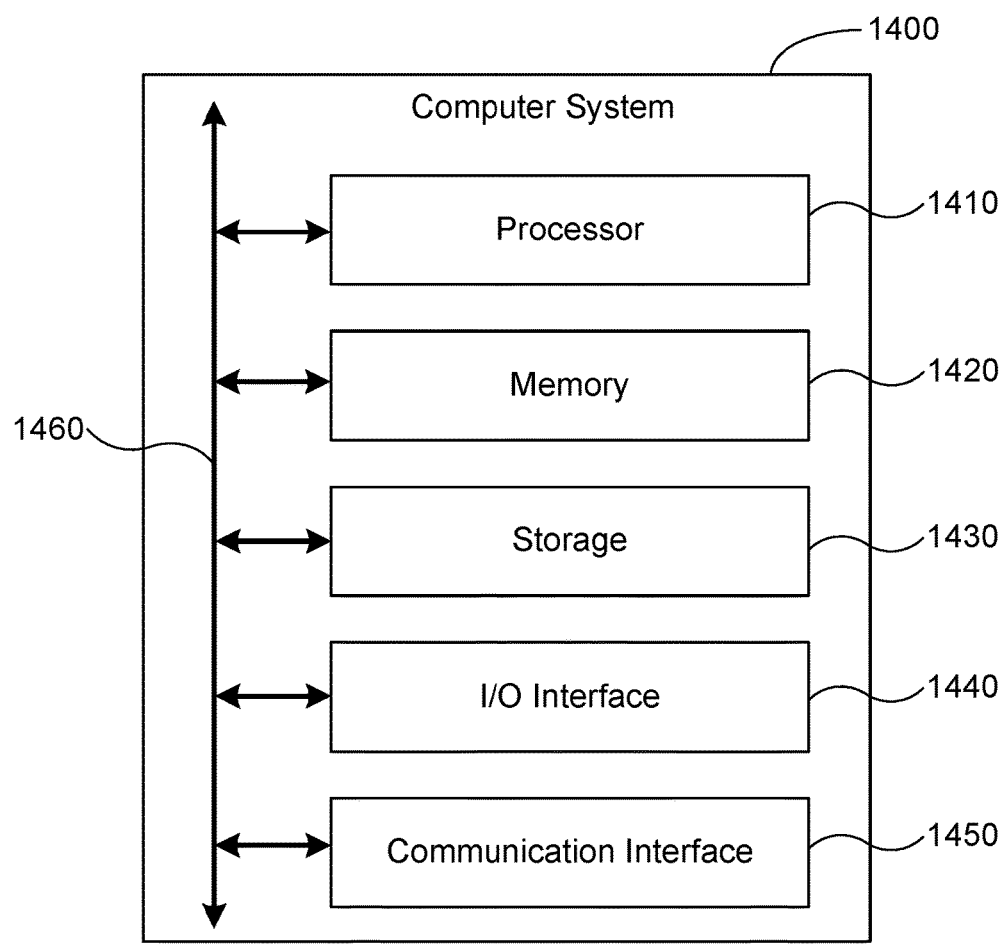
FIG. 14 illustrates an example computer system.

FIG. 14 illustrates an example computer system 1400. In particular embodiments, one or more computer systems 1400 may perform one or more steps of one or more methods described or illustrated herein. In particular embodiments, one or more computer systems 1400 may provide functionality described or illustrated herein. In particular embodiments, software running on one or more computer systems 1400 may perform one or more steps of one or more methods described or illustrated herein or may provide functionality described or illustrated herein. Particular embodiments may include one or more portions of one or more computer systems 1400. In particular embodiments, a computer system may be referred to as a processor, a controller, a computing device, a computing system, a computer, a general-purpose computer, or a data-processing apparatus. Herein, reference to a computer system may encompass one or more computer systems, where appropriate.

Computer system 1400 may take any suitable physical form. As an example, computer system 1400 may be an embedded computer system, a system-on-chip (SOC), a single-board computer system (SBC), a desktop computer system, a laptop or notebook computer system, a mainframe, a mesh of computer systems, a server, a tablet computer system, or any suitable combination of two or more of these. As another example, all or part of computer system 1400 may be combined with, coupled to, or integrated into a variety of devices, including, but not limited to, a camera, camcorder, personal digital assistant (PDA), mobile telephone, smartphone, electronic reading device (e.g., an e-reader), game console, smart watch, clock, calculator, television monitor, flat-panel display, computer monitor, vehicle display (e.g., odometer display or dashboard display), vehicle navigation system, lidar system, ADAS, autonomous vehicle, autonomous-vehicle driving system, cockpit control, camera view display (e.g., display of a rear-view camera in a vehicle), eyewear, or head-mounted display. Where appropriate, computer system 1400 may include one or more computer systems 1400; be unitary or distributed; span multiple locations; span multiple machines; span multiple data centers; or reside in a cloud, which may include one or more cloud components in one or more networks. Where appropriate, one or more computer systems 1400 may perform without substantial spatial or temporal limitation one or more steps of one or more methods described or illustrated herein. As an example, one or more computer systems 1400 may perform in real time or in batch mode one or more steps of one or more methods described or illustrated herein. One or more computer systems 1400 may perform at different times or at different locations one or more steps of one or more methods described or illustrated herein, where appropriate.

As illustrated in the example of FIG. 14, computer system 1400 may include a processor 1410, memory 1420, storage 1430, an input/output (I/O) interface 1440, a communication interface 1450, or a bus 1460. Computer system 1400 may include any suitable number of any suitable components in any suitable arrangement.

In particular embodiments, processor 1410 may include hardware for executing instructions, such as those making up a computer program. As an example, to execute instructions, processor 1410 may retrieve (or fetch) the instructions from an internal register, an internal cache, memory 1420, or storage 1430; decode and execute them; and then write one or more results to an internal register, an internal cache, memory 1420, or storage 1430. In particular embodiments, processor 1410 may include one or more internal caches for data, instructions, or addresses. Processor 1410 may include any suitable number of any suitable internal caches, where appropriate. As an example, processor 1410 may include one or more instruction caches, one or more data caches, or one or more translation lookaside buffers (TLBs). Instructions in the instruction caches may be copies of instructions in memory 1420 or storage 1430, and the instruction caches may speed up retrieval of those instructions by processor 1410. Data in the data caches may be copies of data in memory 1420 or storage 1430 for instructions executing at processor 1410 to operate on; the results of previous instructions executed at processor 1410 for access by subsequent instructions executing at processor 1410 or for writing to memory 1420 or storage 1430; or other suitable data. The data caches may speed up read or write operations by processor 1410. The TLBs may speed up virtual-address translation for processor 1410. In particular embodiments, processor 1410 may include one or more internal registers for data, instructions, or addresses. Processor 1410 may include any suitable number of any suitable internal registers, where appropriate. Where appropriate, processor 1410 may include one or more arithmetic logic units (ALUs); may be a multi-core processor; or may include one or more processors 1410.

In particular embodiments, memory 1420 may include main memory for storing instructions for processor 1410 to execute or data for processor 1410 to operate on. As an example, computer system 1400 may load instructions from storage 1430 or another source (such as, for example, another computer system 1400) to memory 1420. Processor 1410 may then load the instructions from memory 1420 to an internal register or internal cache. To execute the instructions, processor 1410 may retrieve the instructions from the internal register or internal cache and decode them. During or after execution of the instructions, processor 1410 may write one or more results (which may be intermediate or final results) to the internal register or internal cache. Processor 1410 may then write one or more of those results to memory 1420. One or more memory buses (which may each include an address bus and a data bus) may couple processor 1410 to memory 1420. Bus 1460 may include one or more memory buses. In particular embodiments, one or more memory management units (MMUs) may reside between processor 1410 and memory 1420 and facilitate accesses to memory 1420 requested by processor 1410. In particular embodiments, memory 1420 may include random access memory (RAM). This RAM may be volatile memory, where appropriate. Where appropriate, this RAM may be dynamic RAM (DRAM) or static RAM (SRAM). Memory 1420 may include one or more memories 1420, where appropriate.

In particular embodiments, storage 1430 may include mass storage for data or instructions. As an example, storage 1430 may include a hard disk drive (HDD), a floppy disk drive, flash memory, an optical disc, a magneto-optical disc, magnetic tape, or a Universal Serial Bus (USB) drive or a combination of two or more of these. Storage 1430 may include removable or non-removable (or fixed) media, where appropriate. Storage 1430 may be internal or external to computer system 1400, where appropriate. In particular embodiments, storage 1430 may be non-volatile, solid-state memory. In particular embodiments, storage 1430 may include read-only memory (ROM). Where appropriate, this ROM may be mask ROM (MROM), programmable ROM (PROM), erasable PROM (EPROM), electrically erasable PROM (EEPROM), flash memory, or a combination of two or more of these. Storage 1430 may include one or more storage control units facilitating communication between processor 1410 and storage 1430, where appropriate. Where appropriate, storage 1430 may include one or more storages 1430.

In particular embodiments, I/O interface 1440 may include hardware, software, or both, providing one or more interfaces for communication between computer system 1400 and one or more I/O devices. Computer system 1400 may include one or more of these I/O devices, where appropriate. One or more of these I/O devices may enable communication between a person and computer system 1400. As an example, an I/O device may include a keyboard, keypad, microphone, monitor, mouse, printer, scanner, speaker, camera, stylus, tablet, touch screen, trackball, another suitable I/O device, or any suitable combination of two or more of these. An I/O device may include one or more sensors. Where appropriate, I/O interface 1440 may include one or more device or software drivers enabling processor 1410 to drive one or more of these I/O devices. I/O interface 1440 may include one or more I/O interfaces 1440, where appropriate.

In particular embodiments, communication interface 1450 may include hardware, software, or both providing one or more interfaces for communication (such as, for example, packet-based communication) between computer system 1400 and one or more other computer systems 1400 or one or more networks. As an example, communication interface 1450 may include a network interface controller (NIC) or network adapter for communicating with an Ethernet or other wire-based network or a wireless NIC (WNIC); a wireless adapter for communicating with a wireless network, such as a WI-FI network; or an optical transmitter (e.g., a laser or a light-emitting diode) or an optical receiver (e.g., a photodetector) for communicating using fiber-optic communication or free-space optical communication. Computer system 1400 may communicate with an ad hoc network, a personal area network (PAN), an in-vehicle network (IVN), a local area network (LAN), a wide area network (WAN), a metropolitan area network (MAN), or one or more portions of the Internet or a combination of two or more of these. One or more portions of one or more of these networks may be wired or wireless. As an example, computer system 1400 may communicate with a wireless PAN (WPAN) (such as, for example, a BLUETOOTH WPAN), a WI-FI network, a Worldwide Interoperability for Microwave Access (WiMAX) network, a cellular telephone network (such as, for example, a Global System for Mobile Communications (GSM) network), or other suitable wireless network or a combination of two or more of these. As another example, computer system 1400 may communicate using fiber-optic communication based on 100 Gigabit Ethernet (100 GbE), 10 Gigabit Ethernet (10 GbE), or Synchronous Optical Networking (SONET). Computer system 1400 may include any suitable communication interface 1450 for any of these networks, where appropriate. Communication interface 1450 may include one or more communication interfaces 1450, where appropriate.

In particular embodiments, bus 1460 may include hardware, software, or both coupling components of computer system 1400 to each other. As an example, bus 1460 may include an Accelerated Graphics Port (AGP) or other graphics bus, a controller area network (CAN) bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these. Bus 1460 may include one or more buses 1460, where appropriate.

In particular embodiments, various modules, circuits, systems, methods, or algorithm steps described in connection with the implementations disclosed herein may be implemented as electronic hardware, computer software, or any suitable combination of hardware and software. In particular embodiments, computer software (which may be referred to as software, computer-executable code, computer code, a computer program, computer instructions, or instructions) may be used to perform various functions described or illustrated herein, and computer software may be configured to be executed by or to control the operation of computer system 1400. As an example, computer software may include instructions configured to be executed by processor 1410. In particular embodiments, owing to the interchangeability of hardware and software, the various illustrative logical blocks, modules, circuits, or algorithm steps have been described generally in terms of functionality. Whether such functionality is implemented in hardware, software, or a combination of hardware and software may depend upon the particular application or design constraints imposed on the overall system.

In particular embodiments, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), blu-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In particular embodiments, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various embodiments have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately," "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:

1. A lidar system comprising:
   a light source configured to emit a ranging pulse of light that is directed into a field of regard of the lidar system, wherein the light source comprises a seed laser diode configured to produce a seed pulse of light and an optical amplifier configured to amplify the seed pulse of light to produce the ranging pulse of light;
   a fiber-optic splitter located within the light source, wherein the fiber-optic splitter is configured to split off a portion of the ranging pulse of light to produce a trigger pulse of light that is directed to a receiver of the lidar system;
   the receiver, wherein the receiver is configured to:
      detect, at a first time, at least a portion of the trigger pulse of light; and
      detect, at a second time subsequent to the first time, a portion of the ranging pulse of light scattered by a target located a distance from the lidar system; and
   a processor configured to determine the distance from the lidar system to the target based at least in part on the first time and the second time.

2. The lidar system of claim 1, wherein the fiber-optic splitter comprises:
   an input fiber configured to receive the ranging pulse from an output fiber of the light source;
   a monitor fiber configured to direct the trigger pulse to the receiver; and
   a main output fiber configured to receive the ranging pulse after the trigger pulse has been split off and direct the ranging pulse to a collimator to produce a free-space output beam.

3. The lidar system of claim 1, wherein the fiber-optic splitter is located between the seed laser and the optical amplifier, wherein splitting off the portion of the ranging pulse to produce the trigger pulse comprises splitting off the portion of the ranging pulse produced by the seed laser prior to the ranging pulse being amplified by the optical amplifier.

4. The lidar system of claim 1, wherein:
   the optical amplifier comprises a first amplifier stage and a second amplifier stage located after the first amplifier stage; and
   the fiber-optic splitter is located between the first and second amplifier stages, wherein splitting off the portion of the ranging pulse to produce the trigger pulse comprises splitting off the portion of the ranging pulse after being amplified by the first amplifier stage and prior to being amplified by the second amplifier stage.

5. The lidar system of claim 1, wherein the optical amplifier comprises one or more fiber-optic amplifier stages.

6. The lidar system of claim 1, further comprising an optical-delay fiber configured to temporally delay the ranging pulse with respect to the trigger pulse, wherein:
   the optical-delay fiber comprises a length of optical fiber located after the fiber-optic splitter; and
   after the trigger pulse is split off from the ranging pulse, the ranging pulse propagates through the length of optical fiber.

7. The lidar system of claim 6, wherein the optical-delay fiber provides a temporal delay of the ranging pulse with respect to the trigger pulse of between 1 ns and 200 ns.

8. The lidar system of claim 6, wherein the receiver is further configured to detect, after the first time and prior to the second time, internally scattered light from the ranging pulse scattered from within the lidar system.

9. The lidar system of claim 8, wherein the internally scattered light comprises light from the ranging pulse scattered by a window of the lidar system.

10. The lidar system of claim 9, wherein the processor is further configured to determine, based at least in part on the internally scattered light detected by the receiver, that at least a portion of the window is obscured or damaged.

11. The lidar system of claim 10, wherein, the processor is further configured to send, in response to determining that the window is obscured or damaged, a notification that the window needs to be cleaned or repaired.

12. The lidar system of claim 1, wherein the fiber-optic splitter is configured to split off less than or equal to 10% of an energy of the ranging pulse of light to produce the trigger pulse.

13. The lidar system of claim 1, wherein the trigger pulse of light is split off from the ranging pulse of light prior to the ranging pulse of light being directed into the field of regard of the lidar system.

14. The lidar system of claim 1, further comprising a scanner configured to receive the ranging pulse emitted by the light source after the trigger pulse has been split off by the fiber-optic splitter and direct the ranging pulse into the field of regard of the lidar system.

15. The lidar system of claim 1, further comprising a mirror configured to:
receive the trigger pulse from the fiber-optic splitter; and
reflect the trigger pulse to direct the trigger pulse to the receiver.

16. The lidar system of claim 1, further comprising an optical diffuser configured to:
receive the trigger pulse from the fiber-optic splitter; and
scatter the trigger pulse over an angular range to direct the portion of the trigger pulse to the receiver.

17. The lidar system of claim 16, wherein the optical diffuser is a transmissive diffuser or a reflective diffuser.

18. The lidar system of claim 16, wherein:
the receiver comprises a housing that contains a detector configured to detect the portion of the trigger pulse and the portion of the ranging pulse; and
the optical diffuser is located within or is part of the receiver housing.

19. The lidar system of claim 1, wherein:
the trigger pulse is directed to the receiver via an optical fiber; and
the receiver comprises a housing comprising a feedthrough configured to receive the trigger pulse via the optical fiber.

20. The lidar system of claim 1, wherein the receiver comprises an opaque housing configured to reduce stray light that is incident on a detector of the receiver.

21. The lidar system of claim 1, wherein the receiver comprises a housing with a baffled interior surface configured to reduce stray light that is incident on a detector of the receiver.

22. The lidar system of claim 1, wherein the receiver comprises an avalanche photodiode (APD) configured to detect the portion of the trigger pulse and the portion of the ranging pulse.

23. The lidar system of claim 1, wherein the receiver comprises:
a detector configured to detect the portion of the trigger pulse; and
an avalanche photodiode (APD) configured to detect the portion of the ranging pulse.

24. The lidar system of claim 1, wherein the emitted ranging pulse of light is one of a plurality of pulses of light emitted by the light source, and the lidar system further comprises a scanner configured to scan at least a portion of the emitted pulses of light across the field of regard of the lidar system.

25. A lidar system comprising:
a light source configured to emit a ranging pulse of light that is directed into a field of regard of the lidar system;
a fiber-optic splitter configured to split off a portion of the ranging pulse of light to produce a trigger pulse of light that is directed to a receiver of the lidar system;
an optical-delay fiber configured to temporally delay the ranging pulse of light with respect to the trigger pulse of light, wherein:
the optical delay fiber comprises a length of optical fiber located after the fiber-optic splitter; and
after the trigger pulse of light is split off from the ranging pulse of light, the ranging pulse of light propagates through the length of optical fiber;
the receiver, wherein the receiver is configured to:
detect, at a first time, at least a portion of the trigger pulse of light;
detect, at a second time subsequent to the first time, internally scattered light from the ranging pulse of light scattered from within the lidar system; and
detect, at a third time subsequent to the second time, a portion of the ranging pulse of light scattered by a target located a distance from the lidar system; and
a processor configured to determine the distance from the lidar system to the target based at least in part on the first time and the third time.

26. The lidar system of claim 25, wherein:
the internally scattered light comprises light from the ranging pulse scattered by a window of the lidar system; and
the processor is further configured to determine, based at least in part on the internally scattered light detected by the receiver, that at least a portion of the window is obscured or damaged.

27. The lidar system of claim 25, wherein the light source comprises a direct-emitter laser diode configured to emit the ranging pulse of light.

28. A lidar system comprising:
a light source configured to emit a ranging pulse of light that is directed into a field of regard of the lidar system, wherein the light source comprises a seed laser diode configured to produce a seed pulse of light and a semiconductor optical amplifier configured to amplify the seed pulse of light to produce the ranging pulse of light;
a fiber-optic splitter configured to split off a portion of the ranging pulse of light to produce a trigger pulse of light that is directed to a receiver of the lidar system;
the receiver, wherein the receiver is configured to:
detect, at a first time, at least a portion of the trigger pulse of light; and
detect, at a second time subsequent to the first time, a portion of the ranging pulse of light scattered by a target located a distance from the lidar system; and
a processor configured to determine the distance from the lidar system to the target based at least in part on the first time and the second time.

29. The lidar system of claim 28, further comprising an optical-delay fiber configured to temporally delay the ranging pulse with respect to the trigger pulse, wherein:
the optical-delay fiber comprises a length of optical fiber located after the fiber-optic splitter; and
after the trigger pulse is split off from the ranging pulse, the ranging pulse propagates through the length of optical fiber.

30. The lidar system of claim 28, wherein:
the receiver is further configured to detect, after the first time and prior to the second time, internally scattered light from the ranging pulse scattered by a window of the lidar system; and
the processor is further configured to determine, based at least in part on the internally scattered light detected by the receiver, that at least a portion of the window is obscured or damaged.

* * * * *